US011396430B2

(12) United States Patent
Phillips et al.

(10) Patent No.: US 11,396,430 B2
(45) Date of Patent: Jul. 26, 2022

(54) METHODS, SYSTEMS, AND APPARATUSES, FOR OPERATING A MATERIAL HANDLING SYSTEM

(71) Applicant: Intelligrated Headquarters, LLC, Mason, OH (US)

(72) Inventors: Carson Phillips, Glenwood, MD (US); Darius Scott, Baltimore, MD (US); Todd Eliot Green, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/104,523

(22) Filed: Nov. 25, 2020

(65) Prior Publication Data

US 2021/0147158 A1 May 20, 2021

Related U.S. Application Data

(63) Continuation of application No. 16/433,421, filed on Jun. 6, 2019, now Pat. No. 10,882,703.

(51) Int. Cl.
*B65G 47/54* (2006.01)
*B65G 47/52* (2006.01)
*B65G 43/08* (2006.01)

(52) U.S. Cl.
CPC .............. *B65G 47/54* (2013.01); *B65G 43/08* (2013.01)

(58) Field of Classification Search
CPC ......... B65G 43/08; B65G 47/52; B65G 47/54
(Continued)

(56) References Cited

U.S. PATENT DOCUMENTS

| 4,573,863 A | 3/1986 | Picotte |
| 6,005,211 A | 12/1999 | Huang et al. |

(Continued)

FOREIGN PATENT DOCUMENTS

| CN | 101256943 A | 9/2008 |
| CN | 201276355 Y | 7/2009 |

(Continued)

OTHER PUBLICATIONS

Extended European search report issued in European Application No. 20177620.0 dated Oct. 22, 2020, 12 pages.
(Continued)

*Primary Examiner* — Douglas A Hess
(74) *Attorney, Agent, or Firm* — Alston & Bird LLP

(57) ABSTRACT

A material handling apparatus includes a first pop-up belt abutting a first cam. The first pop-up belt is configured to facilitate movement of a package between a first conveyor and a second conveyor. a separator wall abuts a second cam. The separator wall is configured to control movement of the package between the first conveyor and the second conveyor. In response to the camshaft rotating in a first direction, the first cam causes the first pop-up belt to extend out from the first conveyor. The second cam causes the separator wall to move to a first position. I in the first position, the separator wall allows the package to move from the first conveyor to the second conveyor. In response to the camshaft rotating in a second direction, the first pop-up belt move to a retracted position while the separator wall to move to a second position.

20 Claims, 24 Drawing Sheets

(58) Field of Classification Search
USPC .............. 198/407, 413, 570, 576, 586, 607
See application file for complete search history.

(56) References Cited

U.S. PATENT DOCUMENTS

| | | | |
|---|---|---|---|
| 6,332,749 | B1 | 12/2001 | Garcia-Balleza et al. |
| 6,505,733 | B2 | 1/2003 | Troupos et al. |
| 6,681,916 | B2 | 1/2004 | Hiroki |
| 6,719,126 | B2 | 4/2004 | Badier et al. |
| 6,845,860 | B1 | 1/2005 | Walker |
| 8,408,383 | B2 | 4/2013 | Whittlesey |
| 9,365,361 | B1 | 6/2016 | Skarlupka |
| 9,376,268 | B2 | 6/2016 | Schiavina |
| 9,452,896 | B2 | 9/2016 | Lee |
| 9,566,677 | B2 | 2/2017 | Wu et al. |
| 10,053,300 | B2 | 8/2018 | Itoh et al. |
| 10,351,353 | B1 | 7/2019 | Skarlupka |
| 10,464,756 | B2 | 11/2019 | Itoh et al. |
| 10,640,303 | B2 | 5/2020 | Kuhn |
| 10,654,652 | B1 | 5/2020 | Folickman et al. |
| 10,882,703 | B2 * | 1/2021 | Phillips ................. B65G 47/53 |
| 10,941,004 | B2 * | 3/2021 | Karol .................... B65G 47/54 |
| 2002/0092734 | A1 | 7/2002 | Troupos et al. |
| 2004/0173436 | A1 | 9/2004 | Baker |

FOREIGN PATENT DOCUMENTS

| | | |
|---|---|---|
| CN | 103619738 A | 3/2014 |
| CN | 107531428 A | 1/2018 |
| CN | 109689535 A | 4/2019 |
| GB | 2471298 B | 12/2013 |
| JP | S49-67358 A | 6/1974 |
| JP | H06-1336 | 1/1994 |

OTHER PUBLICATIONS

Notice of Allowance and Fees Due (PTOL-85) dated Nov. 27, 2020 for U.S. Appl. No. 16/433,421.
Notice of Allowance and Fees Due (PTOL-85) dated Sep. 4, 2020 for U.S. Appl. No. 16/433,421.
Office Action issued in Chinese Application No. 202010509872.6 dated Jul. 12, 2021, 9 pages.
CN Office Action dated Jan. 17, 2022 for CN Application No. 202010509872.
English Translation of CN Office Action dated Jan. 17, 2022 for CN Application No. 202010509872.
CN Office Action dated Apr. 8, 2022 for CN Application No. 202010509872, 3 pages.
English Translation of CN Office Action dated Apr. 8, 20022 for CN Application No. 202010509872, 4 pages.

* cited by examiner

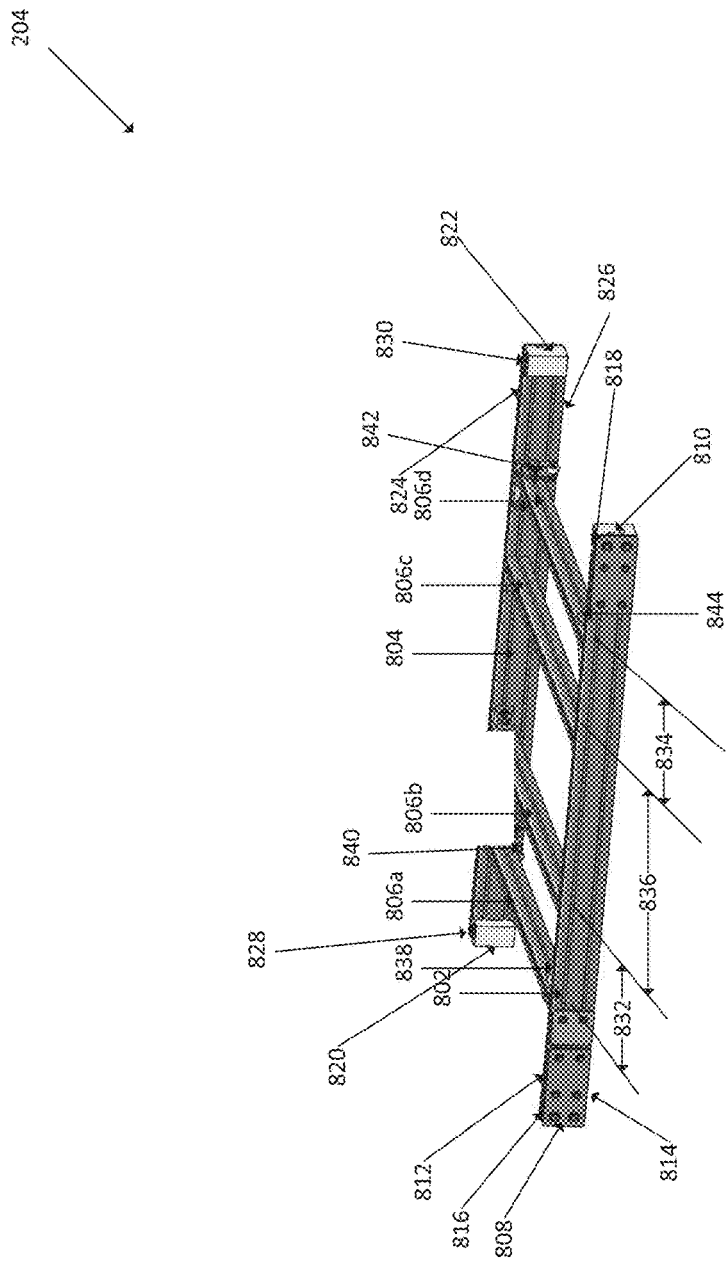
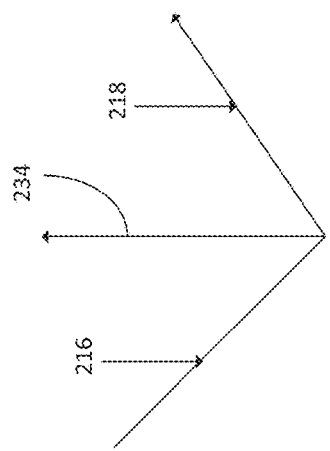
FIG. 8

METHODS, SYSTEMS, AND APPARATUSES, FOR OPERATING A MATERIAL HANDLING SYSTEM

RELATED APPLICATIONS

This application is a continuation of, and claims priority to U.S. application Ser. No. 16/433,421 filed on Jun. 6, 2019 entitled "Methods, Systems, and Apparatuses, for Operating a Material Handling System, the entirety of which is incorporated herein.

TECHNOLOGICAL FIELD

The subject disclosure relates generally to a material handling apparatus in a material handling environment.

BACKGROUND

Material handling environments, such as, but not limited to, a warehouse, a shipping, and retail outlets may include various sub-systems that operate in conjunction to perform one or more operations (e.g., package transport, store packages in storage compartments, retrieve packages from the storage compartments, and/or the like). Examples of such sub-systems may include, but are not limited to, conveyors, robotic arms, singulator systems, sorters, Automatic Storage and Retrieval Systems (ASRS) and/or the like. In some scenarios, during the execution of the predetermined operation, packages may be transferred among the various sub-systems.

BRIEF SUMMARY

Various embodiments illustrated herein disclose a material handling apparatus. The material handling apparatus includes an actuation unit comprising a motor, and a camshaft coupled to the motor. The camshaft comprises a first cam and a second cam. Further, the material handling apparatus includes a first pop-up belt abutting the first cam, wherein the first pop-up belt is configured to facilitate movement of a package between a first conveyor and a second conveyor. Furthermore, the material handling apparatus includes a separator wall abutting the second cam, wherein the separator wall is configured to control movement of the package between the first conveyor and the second conveyor. In response to the motor actuating the camshaft in a first direction, the first cam causes the first pop-up belt to extend above the first conveyor to facilitate movement of the package from the first conveyor to the second conveyor, and the second cam causes the separator wall to move to a first position, wherein, in the first position, the separator wall allows the package to move from the first conveyor to the second conveyor. In response to the motor actuating the camshaft in a second direction, the first cam causes the first pop-up belt to move to a retracted position below the first conveyor, and the second cam causes the separator wall to move to a second position that blocks movement of the package between the first conveyor and the second conveyor.

Various embodiments illustrated herein disclose a material handling system comprising a first conveyor. a first sub-system positioned adjacent to the first conveyor. A separator wall positioned between the first conveyor and the first sub-system, wherein the separator wall is configured to control movement of a package between the first conveyor and the first sub-system. A first pop-up belt positioned below the first conveyor, wherein the first pop-up belt is configured to facilitate movement of the package from the first conveyor to the first sub-system. A camshaft comprising a first cam and a second cam, wherein the first cam is coupled to the first pop-up belt and the second cam is coupled to the separator wall, and wherein the camshaft is configured to rotate in a first direction and a second direction. In response to the camshaft rotating in the first direction, the first cam causes the first pop-up belt to extend above the first conveyor to facilitate movement of the package from the first conveyor to the first sub-system, and the second cam causes the separator wall to move to a first position. The separator wall, in the first position, allows the package to move from the first conveyor to the first sub-system. In response to the camshaft rotating in the second direction, the first cam causes the first pop-up belt to move to a retracted position below the first conveyor, and the second cam causes the separator wall to move to a second position that blocks movement of the package between the first conveyor and the first sub-system.

Various embodiments illustrated herein disclose a method for operating a material handling system. The method comprising determining, by a controller, whether a package to be transferred from a first conveyor to a second conveyor is positioned on the first conveyor. Further, the method includes in response to determining that the package is positioned on the first conveyor, actuating, by the controller, a motor to rotate a camshaft in a first direction causing a first pop-up belt to extend above the first conveyor and causing a separator wall, between the first conveyor and the second conveyor, to move to a first position such that the first pop-up belt and the separator wall facilitate movement of the package from the first conveyor to the second conveyor. Furthermore, the method includes in response to determining that the package has moved from the first conveyor to the second conveyor, actuating, by the controller, the motor to rotate the camshaft in a second direction causing the first pop-up belt to move to a retracted position below the first conveyor and causing the separator wall to move to a second position such that the separator wall blocks the movement of the package between the first conveyor and the second conveyor.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 8 illustrates a perspective view of a movable frame, according to one or more embodiments;

DETAILED DESCRIPTION

Figure 1:
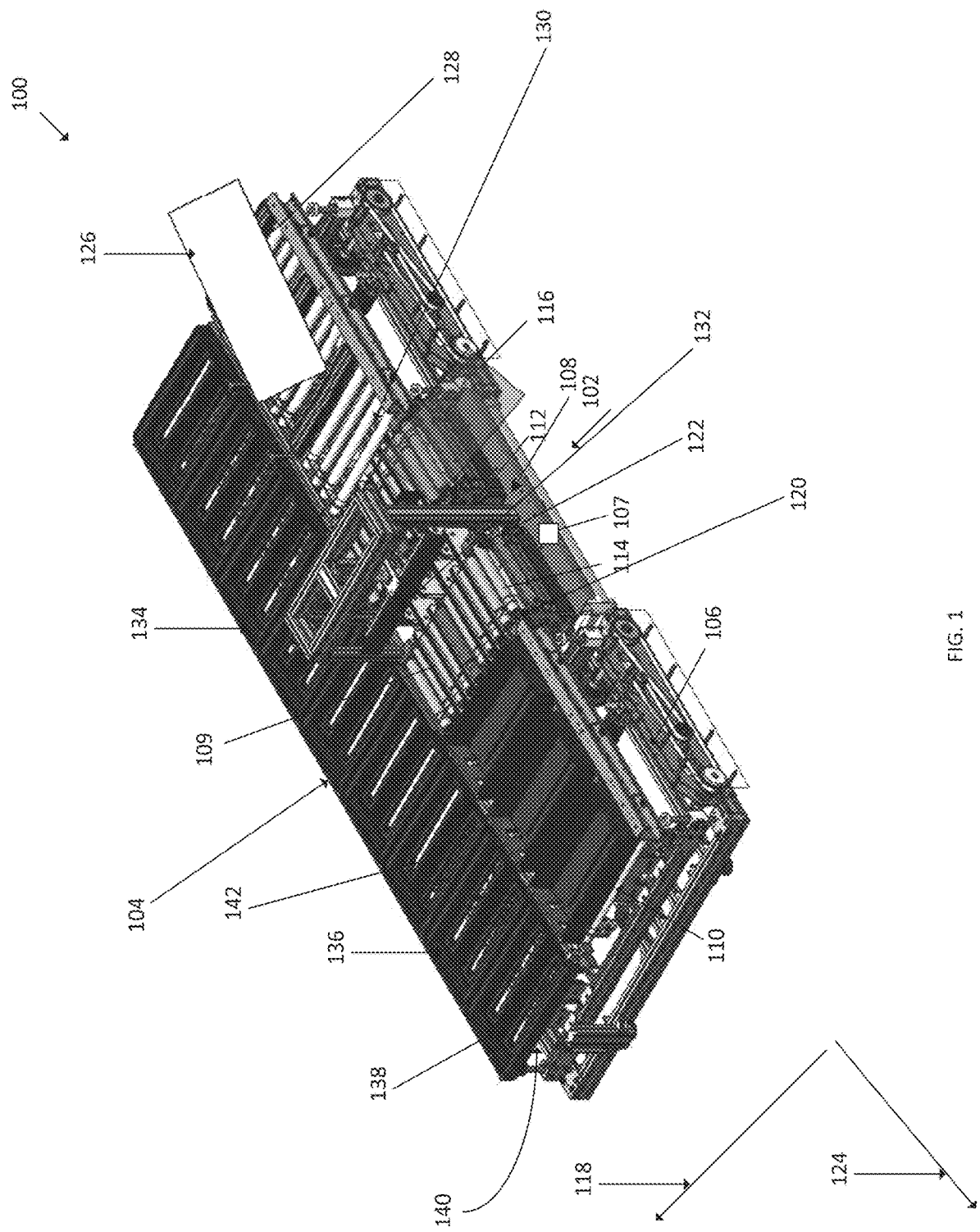
FIG. 1 illustrates a perspective view of a material handling system, in accordance with one or more embodiments.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure, or may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "package" as used herein may correspond to a physical item, parcel, object, element, device, or the like. For example, a warehouse or a retail outlet (e.g., a scene) may be configured to store packages, such as parcels, envelopes, cartons, shipping containers, totes, and/or the like for transit. In some examples, the package may correspond to a two-dimensional (2D) package and/or a three-dimensional (3D) package. In an example embodiment, the 3D package may correspond to a package that has three dimensions (e.g., height, width, and length). In an example embodiment, the 2D package may correspond to a 3D package where one of the dimensions (e.g., height) is negligible. Some examples of the 2D package may include, but are not limited to, a piece of paper, an envelope, etc.

The term "sub-system" as used herein corresponds to a machine, which is configured to perform a task, or a region in a material handling environment where the task is to be performed. Some examples of the sub-system may include, but are not limited to, a conveyor, an ASRS system, a sortation system, a palletizer system, an accumulator region, and/or the like.

The term "conveyor" as used herein corresponds to a material handling apparatus that may be configured to transfer a package or object in a conveyance direction over the conveyance plane. Some examples of the conveyor may include, but are not limited to, a belt based conveyor or a roller based conveyor.

The term "conveyance plane" may correspond to a plane defined by a surface of the conveyor on which a package is placed. In some examples, the package may slide over the plane, when the conveyor is operated.

The term "conveyance axis" may correspond to an axis along which the package is transferred, when the conveyor operates.

Material handling environments, such as warehouses and retail outlets, include one or more sub-systems such as conveyors, robotic arms, singulator systems, sorters, and/or the like. Such sub-systems may operate in conjunction to execute a predetermined operation in the material handling environments. In certain implementations, during the execution of the predetermined operation, the packages may be transferred from one sub-system to another. Typically, robotic arms are utilized to transfer the packages amongst the various sub-systems. However, a count of packages transferred amongst the various sub-systems may limited to a capacity of the robotic arms. In an example embodiment, the capacity of the robotic arm may be determined based on a count of the packages that the robotic arm may pick and place, per minute. Accordingly, the overall productivity of the material handling environment may be dependent on the capacity of the robotic arm.

Apparatuses, systems, and methods described herein disclose a machine that is capable of transferring packages between one or more sub-systems in the material handling environment. For example, the machine may be capable of transferring packages between a first conveyor and a second conveyor. In an example embodiment, the machine may include a main frame positioned below the first conveyor and the second conveyor. Further, the machine may include an actuation unit positioned on the frame. The actuation unit may include a motor and a camshaft. In some examples, the camshaft is coupled to the motor such that the motor may facilitate rotation of the camshaft in a first direction or in a second direction. In an example embodiment, the first direction may correspond to a clockwise rotation of the camshaft, and the second direction may correspond to an anti-clockwise rotation of the camshaft. In an example embodiment, the camshaft may include a first cam, a second cam, and a third cam. In some examples, the first cam, the second cam, and the third cam may have a profile. In an example embodiment, a profile of a cam may correspond to a contour of the cam. In some examples, the profile of the cam may be such that a radius of the cam at each point on the cam may be different.

In some examples, the first cam, the second cam, and the third cam are positioned on the camshaft in such a manner that the first cam and the third cam may have a same orientation (hereinafter referred to as a first orientation), while the second cam may have a second orientation with respect to the first cam or the third cam. In an example embodiment, an orientation of a cam may be defined as an angle of an arc formed by a point on the cam and the same point on another cam, where the cam and the other cam are coupled to the same camshaft. In an example embodiment, when two cams have same orientation, the angle of the arc is zero. Therefore, the angle of the arc formed by the same points on the first cam and the third cam is zero. In some examples, the angle of the arc formed by the same points on the first cam and the second cam is 270 degrees.

In some examples, the scope of the disclosure is not limited to the first cam, the second cam, and the third cam having the same profile. In an alternative embodiment, the first cam and the third cam may have a first profile and the second cam may have a second profile. In an example embodiment, the first profile may be different from the second profile.

In an example embodiment, the machine further includes a first pop-up belt, a second pop-up belt, and a separator wall, coupled to the main frame. The first pop-up belt and the second pop-up belt may abut the first cam and the third cam, respectively. Further, the first pop-up belt and the second pop-up belt may be movably positioned below the first conveyor and the second conveyor, respectively. For example, the first pop-up belt and the second pop-up belt may be configured to move between a retracted position and an extended position. In an example embodiment, in the retracted position, the first pop-up belt and the second pop-up belt are positioned below the first conveyor and the second conveyor, respectively. In an example embodiment, in the extended position, the first pop-up belt and the second pop-up belt extend above from the first conveyor and the second conveyor, respectively, such that the first pop-up belt and the second pop-up belt are positioned above the first conveyor and the second conveyor, respectively. In some examples, the movement of the first pop-up belt and the second pop-belt between the retracted position and the extended position may be controlled based on the movement of the first cam and the third cam.

In an example embodiment, the separator wall may abut the second cam and may be positioned between the first conveyor and the second conveyor. In some examples, a first end of the separator wall may abut the second cam. In an example embodiment, the separator wall may be configured to control the movement of the package between the first conveyor and the second conveyor. For example, the separator wall may be configured to block the movement of the package between the first conveyor and the second conveyor, when the separator wall is in a first position. In an example embodiment, in the first position, a second end of the separator wall extends above the first conveyor and the second conveyor. In another example, the separator wall may be configured to allow the movement of the package between the first conveyor and the second conveyor, when the separator wall is in a second position. In an example embodiment, in the second position, the second end of the separator wall retracts below the first conveyor and the second conveyor. Similar to the first pop-up belt and the second pop-up belt, the movement of the separator wall between the first position and the second position is controlled based on the movement of second cam on the camshaft.

In an example embodiment, the motor may cause the camshaft to rotate in a first direction or a second direction. Since the second cam is out of phase from the first cam and the third cam, the separator wall may move in a opposite direction to that of the first pop-up belt and the second pop-up belt.

For example, when the motor causes the camshaft to rotate in the first direction, the first pop-up belt and the second pop-up belt may move to the extended position, while the separator wall may move to the first position (i.e., the second end of the separator wall retracts below the first conveyor and the second conveyor). In the extended position, the first pop-up belt and the second pop-up belt are positioned above the first conveyor and the second conveyor. Further, the first pop-up belt may engage with the package on the first conveyor and may cause the package to move onto the second conveyor. In some examples, the second pop-belt (that is positioned above the second conveyor) may be configured to receive the package from the first conveyor.

Similarly, when the motor causes the camshaft to rotate in the second direction, the first pop-up belt and the second pop-up belt may move to the retracted position, while the separator wall may move to the second position (i.e., the second end of the separator wall extends above the first conveyor and the second conveyor). Accordingly, the separator wall may block the movement of the package between the first conveyor and the second conveyor.

Therefore, the machine may enable package transfer/movement among the various sub-systems without the need of the robotic arm. Accordingly, the overall productivity of the material handling environment improves.

FIG. 1 illustrates a material handling system 100, according to one or more embodiments described herein. The material handling system 100 includes a first sub-system 102, a second sub-system 104, a machine 106, and a control system 107.

In an example embodiment, the first sub-system 102 may correspond to a package divert assembly that may further include a first conveyor 110, a pusher plate assembly 112, and a platform 114. In some examples, the platform 114 may be further coupled to another sub-system (not shown) that may be configured to transfer a package on the platform 114. For example, the platform 114 may be coupled to another conveyor (not shown) that may be configured to transfer the package on the platform 114. In some examples, the platform 114 may, itself, be a part of the other conveyor, without departing from the scope of the disclosure. In an example embodiment, the other conveyor may have a first conveyance plane 116 and may be configured to transfer the package along a first conveyance axis 118. Since platform 114 is a part of the other conveyor, the platform 114 may also have the first conveyance plane 116. Further, the platform 114 may be configured to receive the package being transferred along a first conveyance axis 118 by the other conveyor. In an example embodiment, the platform 114 may further have a first edge 120 and a second edge 122 along a second conveyance axis 124. In an example embodiment, the first conveyance axis 118 may be orthogonal to the second conveyance axis 124.

The first conveyor 110 may be positioned at the first edge 120 of the platform 114 along the second conveyance axis 124. In some examples, the first conveyor 110 may be configured to transfer/transport the package along the second conveyance axis 124. In some examples, the first conveyor 110 may further have a second conveyance plane 126. In an example embodiment, the first conveyor 110 may be positioned on the machine 106. Further, the first conveyor 110 may include a plurality of rollers 128 that may spaced apart from each other to define one or more gaps 130.

In some examples, the scope of the disclosure is not limited to the first conveyor 110 including the plurality of rollers 128. In an alternative embodiment, the first conveyor 110 may be a belt based conveyor. In such a scenario, the belt of the conveyor may define the one or more gaps 130.

In an example embodiment, the pusher plate assembly 112 may be positioned at the second edge 122 of the platform 114 along the second conveyance axis 124. In an example embodiment, the pusher plate assembly 112 may include a pusher plate 132 that may be configured to translate in along the second conveyance axis 124. In some examples, the pusher plate 132 may be actuated using a servo motor (not shown) or through hydraulic systems (not shown). In an example embodiment, the pusher plate 132 may be configured to push the package on the platform 114 on to the first conveyor 110. In some examples, the scope of the disclosure is not limited to using the pusher plate assembly 112 to divert the package onto the first conveyor 110. In an alternate embodiment, the sub-system 102 may be devoid of the pusher plate assembly 132. In such an embodiment, the platform 114 may include perpendicular belts 109 that are configured to move the package along the second conveyance axis 124 onto the first conveyor 110.

In some examples, the scope of the disclosure is not limited to the first sub-system 102 as the package divert assembly 108. In an example embodiment, the first sub-system 102 may correspond to any other machine, without departing from the scope of the disclosure. For example, the first sub-system 102 may only include the first conveyor 110.

In an example embodiment, the second sub-system 104 may be positioned adjacent to the first sub-system 102. For example, the second sub-system 104 may be positioned adjacent to the first conveyor 110 along the first conveyance axis 118. In some examples, the second sub-system 104 may correspond to a second conveyor 134 that is configured to transfer packages along the second conveyance axis 124. Further, the second conveyor 134 may be positioned on top of the machine 106. In an example embodiment, the second conveyor 134 may include a plurality of trays 136. Each tray of the plurality of trays 136 may have a top surface 138 and a bottom surface 140. The top surface 138 of each tray of the plurality of trays 136 may define one or more slots 142 that may extend from the top surface 138 to the bottom surface 140.

In some examples, the scope of the disclosure is not limited to the second sub-system 104 to be the second conveyor 134. In an example embodiment, the second sub-system may correspond to any other machine or an area/region within the material handling system 100, without departing from the scope of the disclosure. For example, the second sub-system 104 may correspond to an accumulation zone in the material handling system 100. In another example, the second sub-system may correspond to an Automatic Storage and Retrieval System (ASRS) system.

In an example embodiment, the machine 106 may be configured to facilitate movement of the package between the first sub-system 102 and the second sub-system 104. The structure and the operation of the machine 106 has been described in conjunction with FIGS. 2-24.

Figure 2:
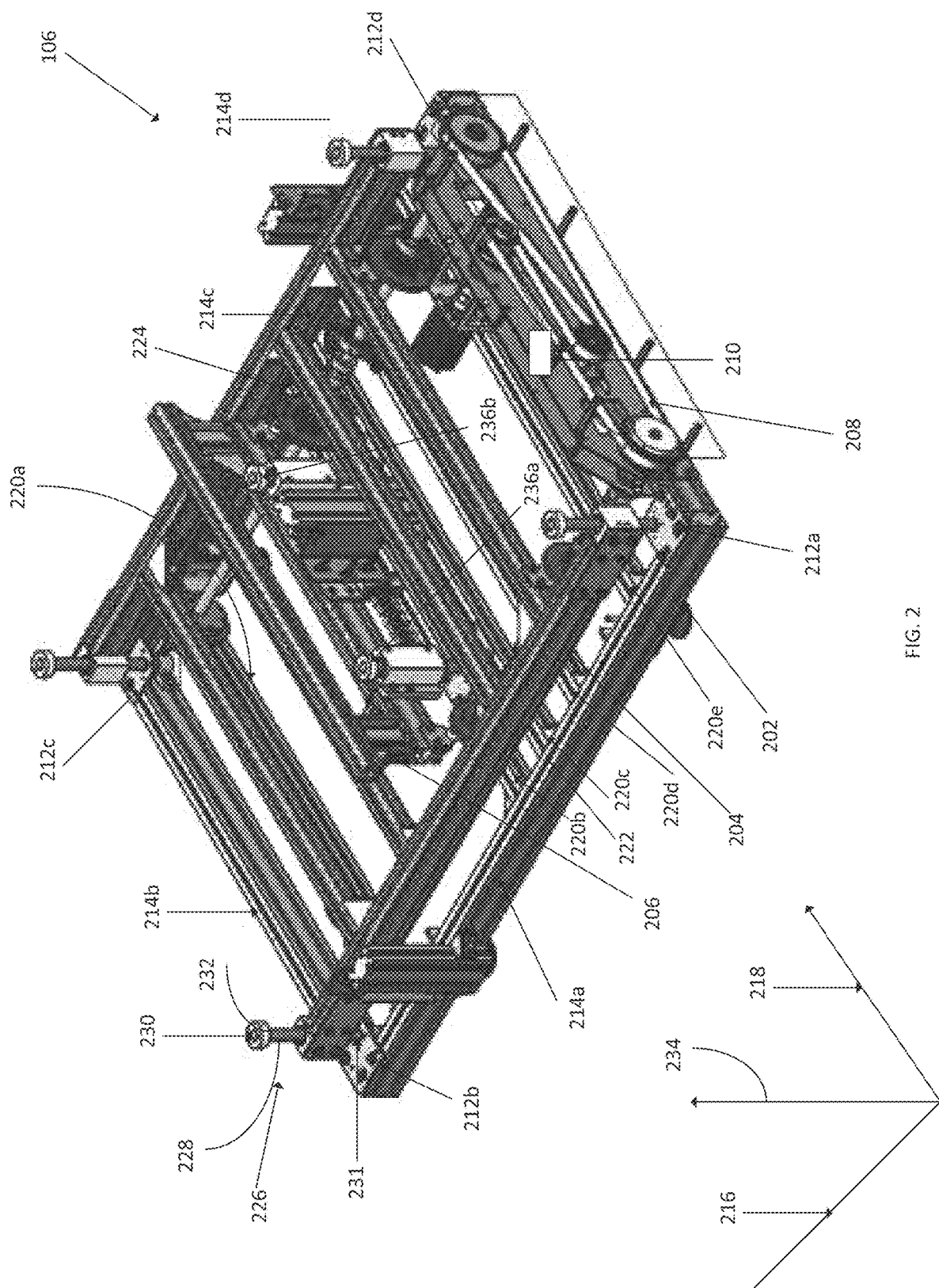
FIG. 2 illustrates a perspective view of a machine, according to one or more embodiments.

FIG. 2 illustrates a perspective view of the machine 106, according to one or more embodiments described herein. The machine 106 includes a main frame 202, a movable frame 204, a separator wall frame 206, a first actuation unit 208, and a second actuation unit 210.

In an example embodiment, the main frame 202 may be positioned on a floor of the material handling system 100. In some examples, the main frame 202 has a rectangular shape and has a plurality of first corners 212a, 212b, 212c, and 212d. Further, the main frame 202 may have a plurality of edges 214a, 214b, 214c, and 214d. In some examples, the edge 214a and the edge 214c are placed along a first axis 216, while the edge 214b and the edge 214d are placed along a second axis 218. A person having ordinary skills in the art would appreciate that the scope of the disclosure is not limited to the main frame 202 having the rectangular shape. In an example embodiment, the shape of the main frame 202 may correspond to any other polygon.

Additionally, the main frame 202 may further include a plurality of first support bars 220a, 220b, 220c, 220d, and 220e. In an example embodiment, the plurality of first support bars 220a, 220b, 220c, 220d, and 220e are placed along the second axis 218 such that a first end 222 of each of the plurality of first support bars 220a, 220b, 220c, 220d, and 220e is coupled to the edge 214a, and a second end 224 of each of the plurality of first support bars 220a, 220b, 220c, 220d, and 220e is coupled to the edge 214c. In some examples, the plurality of first support bars 220a, 220b, 220c, 220d, and 220e may be equidistant from each other. In alternative embodiment, the plurality of first support bars 220a, 220b, 220c, 220d, and 220e may not be equidistant from each other. In such an embodiment, the first support bar 220a may be positioned proximal to the edge 214b. Further, the first support bars 220b, 220c, and 220d may be near a central portion of the main frame 202. In an example embodiment, the central portion of the main frame 202 may correspond to a predetermined region around half a length of the edge 214a. Furthermore, the first support bar 220e may be positioned proximal to the edge 214d.

In an example embodiment, the first actuation unit 208 may be mounted on the edge 214d of the main frame 202 and on the plurality of first support bars 220a, 220b, 220c, 220d, and 220e. The first actuation unit 208 is further described in conjunction with FIG. 3 and FIG. 4.

Figure 3:
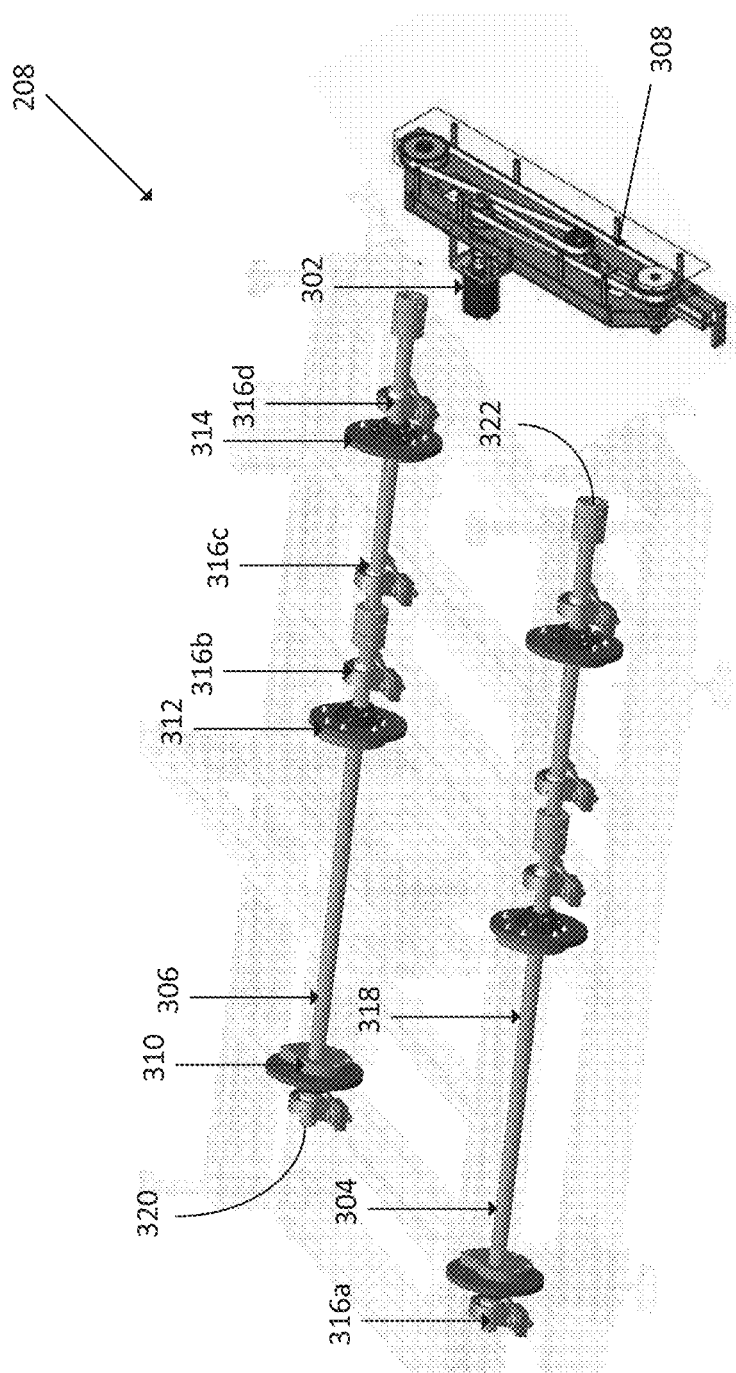
FIG. 3 illustrates an exploded view of a first actuation unit, according to one or more embodiments.

FIG. 3 illustrates an exploded view of the first actuation unit 208, according to one or more embodiments described herein. The first actuation unit 208 includes a motor 302, a first camshaft 304, a second camshaft 306, a serpentine belt and pulley mechanism 308. The motor 302 is coupled to the serpentine belt and pulley mechanism 308. Further, the first camshaft 304 and the second camshaft 306 are coupled to the serpentine belt and pulley mechanism 308. The structure of the serpentine belt and pulley mechanism 308 is further described in conjunction with FIG. 4.

Figure 4:
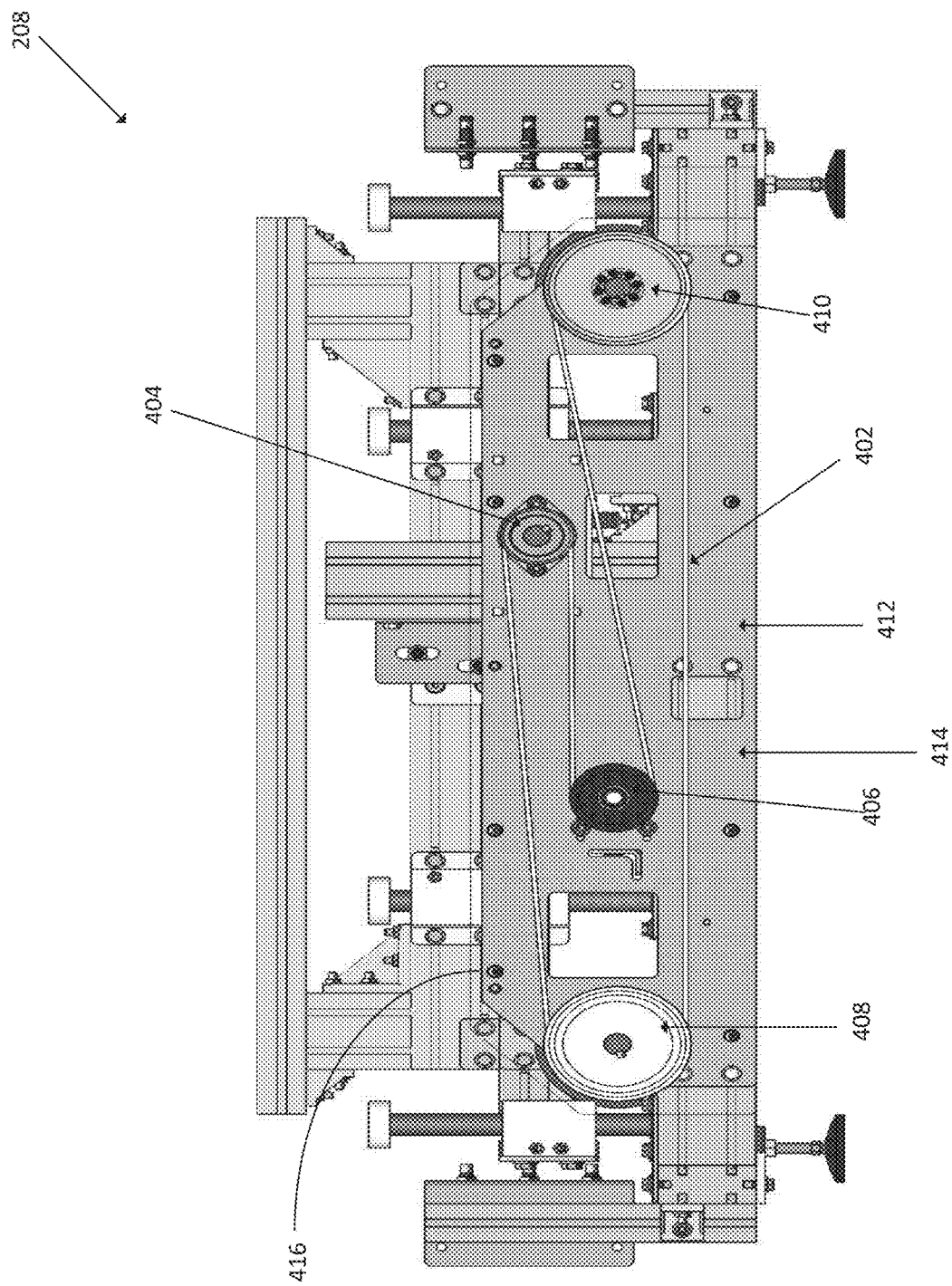
FIG. 4 illustrates a front view of the first actuation unit, according to one or more embodiments.

FIG. 4 illustrates a front view of the first actuation unit 208, according to one or more embodiments described herein. The front view of the first actuation unit 208 depicts the serpentine belt and pulley mechanism 308. The serpentine belt and pulley mechanism 308 includes a first belt 402, a motor pulley 404, a tensioner pulley 406, a first drive pulley 408, a second drive pulley 410, a belt and pulley frame 412. In an example embodiment, the motor pulley 404, the tensioner pulley 406, the first drive pulley 408, the second drive pulley 410 are mounted on a first side 414 of the belt and pulley frame 412. Further, the motor 302 is mounted on a second side 416 of the belt and pulley frame 412 (refer to FIG. 3). In some examples, the motor 302 may be coupled to the motor pulley 404. Further, in some examples, the motor pulley 404 may be further coupled to the tensioner pulley 406, the first drive pulley 408, and the second drive pulley 410, through the first belt 402. Accordingly, when the motor 302 causes the motor pulley 404 to rotate, the motor pulley 404 causes the first drive pulley 408, the second drive pulley 410, and the tensioner pulley 406 to rotate. In some examples, the tensioner pulley 406, the first drive pulley 408, the second drive pulley 410, and the motor pulley 404 are coupled in such a manner that the first drive pulley 408, the second drive pulley 410, and the motor pulley 404 rotate in a same direction, while the tensioner pulley 406 rotate in a opposite direction to the direction of rotation of the motor pulley 404. For example, if the motor pulley 404 rotates in a clockwise direction, the first drive pulley 408 and the second drive pulley 410 also rotate in the clockwise direction. To this end, the tensioner pulley 406 rotates in the anti-clockwise direction.

Referring back to FIG. 3, the first camshaft 304 may be coupled to the first drive pulley 408, and the second camshaft 306 may be coupled to the second drive pulley 410. In an example embodiment, the structure of the first camshaft 304 is similar to the structure of the second camshaft 306. For the purpose of ongoing description, the structure of the first camshaft 304 is described. However, those skilled in the art would appreciate that the structural details of the first camshaft 304, described herein, are also applicable on the second camshaft 306.

In an example embodiment, the first camshaft 304 may include a first cam 310, a second cam 312, a third cam 314, a plurality of bearings 316a, 316b, 316c, and 316d, and a shaft 318. In an example embodiment, the plurality of bearings 316a, 316b, 316c, and 316d are configured to be fixedly mounted on the plurality of first support bars 220a, 220b, 220c, 220d, and 220e. For example, the bearing 316a is fixedly mounted on the first support bar 220a. Similarly, the bearings 316b, 316c, and 316d are fixedly mounted on the first support bars 220b, 220d, and 220e, respectively. In some examples, the shaft 318 may pass through each of the plurality of bearings 316a, 316b, 316c, and 316d. In an example embodiment, the shaft 318 may have a first end 320 and a second end 322. The first end 320 of the shaft 318 is coupled to the bearing 316a and the second end 322 of the shaft 318 is coupled to the first drive pulley 408. In some examples, the shaft 318 is rotatable with respect to the plurality of bearings 316a, 316b, 316c, and 316d.

In an example embodiment, the first cam 310, the second cam 312, and the third cam 314 may be positioned on the shaft 318 at predetermined positions. For example, the first cam 310 may be positioned proximal to the bearing 316a, and the third cam 314 may be positioned proximal to the bearing 316d. Further, the second cam 312 may be positioned between the first cam 310 and the third cam 314. Further, the second cam 312 may be positioned proximal to the first support bar 220c, when the first actuation unit 208 is mounted on the main frame 202. In an example embodiment, when the shaft 318 rotates, the first cam 310, the second cam 312, and the third cam 314 also rotate. In an example embodiment, the structure of the first cam 310, the second cam 312, and the third cam 314 is same. For the purpose of ongoing description, the structure of the first cam 310 is described. However, those having ordinary skills in the art would appreciate that structural details of the first cam 310 are also applicable on the second cam 312 and the third cam 314. The structure of the first cam 310 is described in conjunction with FIG. 5.

Figure 5:
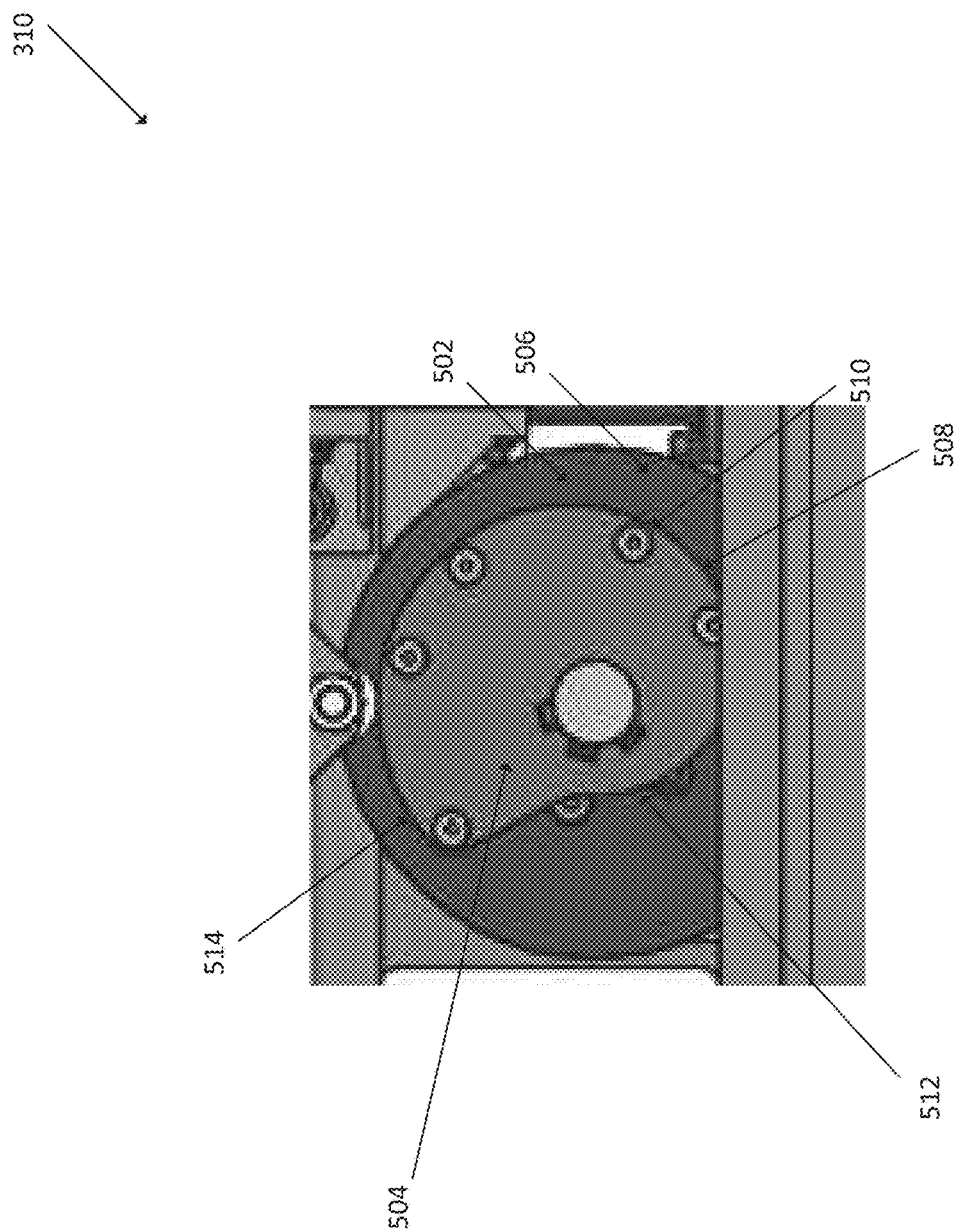
FIG. 5 illustrates a front view of a first cam, according to one or more embodiments.

FIG. 5 illustrates a front view of the first cam 310, according to one or more embodiments described herein. In an example embodiment, the first cam 310 includes a base wheel 502, and cam wheel 504. In some examples, the base wheel 502 has a first surface 506 on which the cam wheel 504 may be coupled. In an example embodiment, the cam wheel 504 has edge 508 that defines a profile 510 of the cam wheel 504. In some examples, the profile 510 of the cam wheel 504 is such that a radius of the cam wheel 504 at each point on the edge 508 varies. For example, the radius of the cam wheel 504 is minimum at point A (depicted by 512) and the radius of the cam wheel 504 is maximum at point B (depicted by 514).

Referring back to FIG. 3, the second cam 312 and the third cam 314 may have the same structure as the first cam 310. However, in some examples, the orientation of the first cam 310, the second cam 312, the third cam 314 on the shaft 318 may differ. For example, the first cam 310 and the third cam 314 may have a first orientation with respect to each other, while the second cam 312 may have a second orientation with respect to the first cam 310 or the third cam 314. In an example embodiment, the orientation of a cam with respect to the other cams may be defined as an angle of an arc formed by a point on a cam (e.g., point A (depicted by 512)) and the same point (e.g., point A (depicted by 512)) on other cams. For example, the orientation of the first cam 310 and the third cam 316 may be same (i.e., the angle of the arc formed by point A 512 on the first cam 310 and the point A 512 on the third cam 314 is 0 degrees). Further, the orientation of the second cam 312 may be different from the orientation of the first cam 310 and the third cam 314. For example, the angle of the arc formed by point A 512 on the first cam 310 and the point A 512 on the second cam 312 is approximately 270 degrees. Therefore, when the point A (depicted by 512) of first cam 310 is pointed upwards, the point B (depicted by 514) on the second cam 312 is pointed upwards. Such an illustration is depicted in FIG. 6 and FIG. 7.

Figure 6:
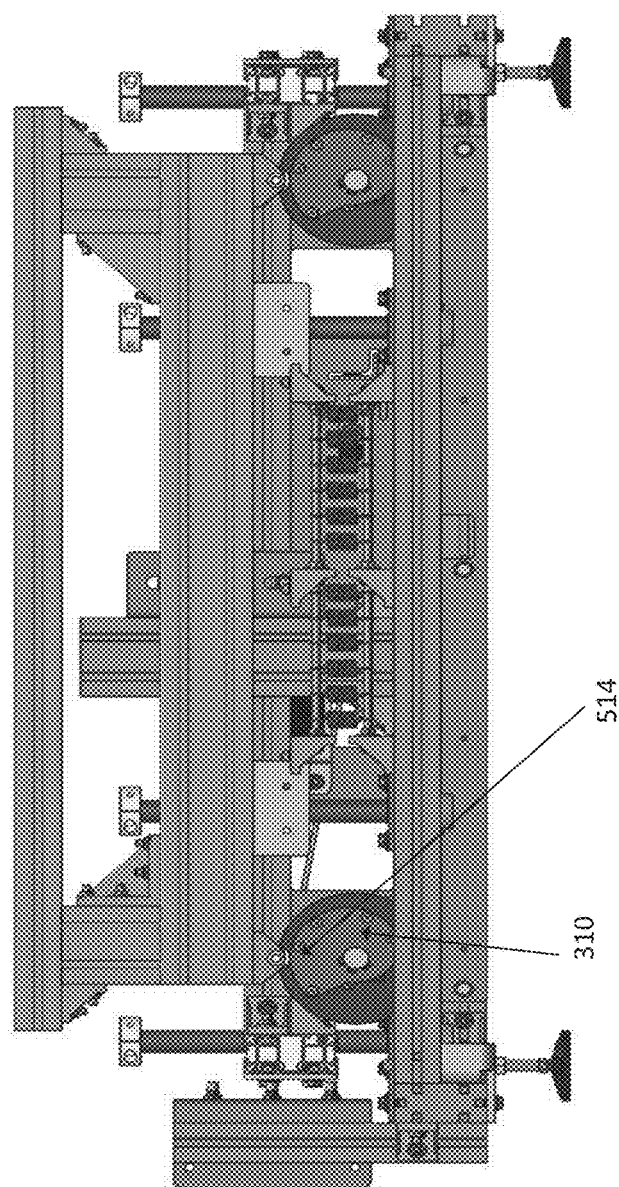
FIG. 6 illustrates a cut view of the machine depicting the first cam, according to one or more embodiments.
Figure 7:
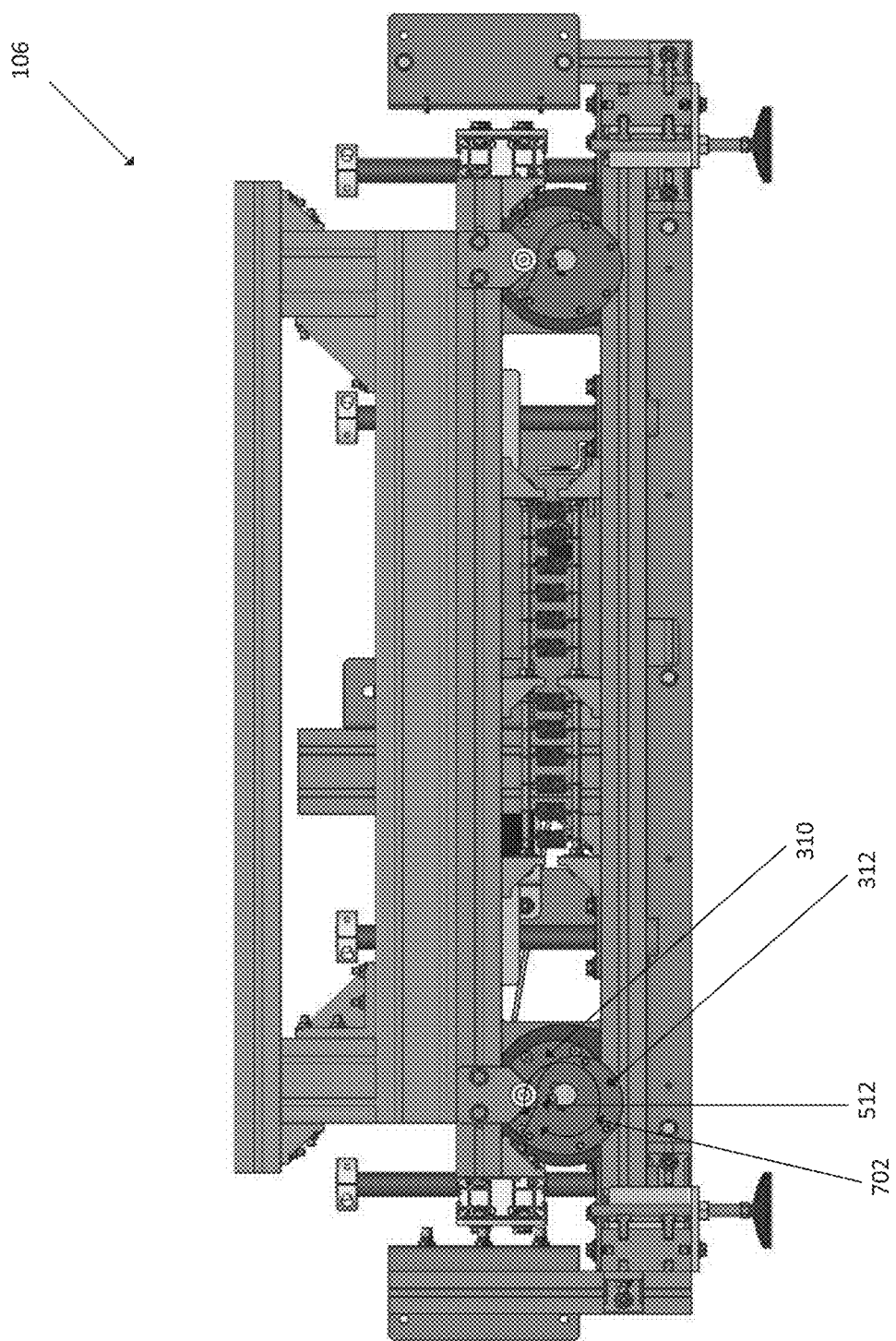
FIG. 7 illustrates another cut view of the machine depicting a second cam and the first cam, according to one or more embodiments.

FIG. 6 illustrates a cut view of the machine 106 depicting the second cam 312, according to one or more embodiments described herein. FIG. 7 illustrates another cut view of the machine 106 depicting the third cam 314 and the second cam 312, according to one or more embodiments described herein. Referring to FIG. 6 and FIG. 7, it can be observed that the point B (depicted by 514) on the second cam 312 is pointed upwards, while point A (depicted by 512) on the third cam 314 is pointed upwards (See FIG. 7). Further, it can be observed from FIG. 7 that the angle of arc (depicted by 702) formed by the point B (depicted by 514) on the third cam 314 and the point B (depicted by 514) on the second cam 312 is approximately 270 degrees. In other words, the second cam 312 is in a flipped orientation with respect to the first cam 310 and the third cam 314.

Referring back to FIG. 2, a first linear guide 226 may be mounted at each of the plurality of first corners 212a, 212b, 212c, and 212d of the main frame 202. The first linear guide 226 includes a vertical shaft 228 and a stopper 230. A first end 231 of the vertical shaft 228 is fixedly coupled to a first corner of the plurality of first corners 212a, 212b, 212c, and 212d (e.g., 212a). Further, a second end 232 of the vertical shaft 228 is coupled to the stopper 230. In an example embodiment, the first linear guide 226 is coupled to each of the plurality of first corners 212a, 212b, 212c, and 212d along a third axis 234.

In an example embodiment, the movable frame 204 may be movably mounted on the main frame 202 through the first linear guide 226 at each first corner of the plurality of first corners 212a, 212b, 212c, and 212d. In some examples, the first linear guide 226 may define a traversal path for the movable frame 204. As the first linear guide 226 is extends from the main frame 202 along the third axis 234 and the first linear guide 226 defines the traversal path for the movable frame 204, the movable frame 204 may be configured to move along the third axis 234. In an example embodiment, the structure of the movable frame 204 is further described in conjunction with FIG. 8.

FIG. 8 illustrates a perspective view of the movable frame 204, according to one or more embodiments.

The movable frame 204 includes a first beam 802, a second beam 804, and a plurality of second support bars 806a, 806b, 806c, and 806d. In an example embodiment, the first beam 802 may be positioned parallel to the second beam 804 along the first axis 216. the first beam 802 has a first end 808, a second end 810, a first top surface 812, and a first bottom surface 814. In an example embodiment, the first top surface 812 of the first beam 802 defines a first through hole 816 at the first end 808 of the first beam 802. Further, the first top surface 812 defines a second through hole 818 at the second end 810 of the first beam 802. Similar to the first beam 802, the second beam 804 has a third end 820, a fourth end 822, a second top surface 824, and a second bottom surface 826. Further, similar to the first beam 802, the second top surface 824 defines a third through hole 828 at the third end 820, and a fourth through hole 830 at the fourth end 822. In an example embodiment, the first through hole 816, the second through hole 818, the third through hole 828, and the fourth through hole 830, are configured to receive the first linear guide 226 (positioned at each first corner of the plurality of first corners 212a, 212b, 212c, and 212d), when the movable frame 204 is mounted on the main frame 202.

In an example embodiment, the plurality of second support bars 806a, 806b, 806c, and 806d is coupled to the first beam 802 and the second beam 804 along the second axis 218. In some examples, the plurality of second support bars 806a, 806b, 806c, and 806d may be coupled to the first beam 802 and the second beam 804 such that a distance between the second support bar 806a and the second support bar 806b (depicted by 832) may be equal to a distance between the second support bar 806c and the second support bar 806d (depicted by 834). Further, the distance between the second support bar 806c and the second support bar 806b (depicted by 836) may be greater than the distance between the second support bar 806b and the second support bar 806a. In some examples, the second support bar 806a may positioned proximal to the first end 808 and the third end 820 of the first beam 802 and the second beam 804, respectively. Further, the second support bar 806d may positioned proximal to the second end 810 and the fourth end 822 of the first beam 802 and the second beam 804, respectively.

In an example embodiment, the movable frame 204 may further include a first leg 838, a second leg 840, a third leg 842, and fourth leg 844. In some examples, the first leg 838 and the second leg 840 may be coupled to the second support bar 806a. Further, the first leg 838 may be proximal to the first beam 802, and the second leg 840 may be proximal to the second beam 804. In some examples, the third leg 842 and the fourth leg 844 may be coupled to the second support bar 806d. The third leg 842 may be proximal to the first beam 802, and the fourth leg 844 may be proximal to the second beam 804. In an example embodiment, the first leg 838, the second leg 840, the third leg 842, and the fourth leg 844 may be configured to extend out from the movable frame 204 along the third axis towards the main frame 202, when the movable frame 204 is mounted on the main frame 202. When the movable frame 204 is mounted on the main frame 202, the third leg 842 and the fourth leg 844 abut the first cam 310 on the first camshaft 304 and first cam 310 in the second camshaft 306, respectively. Similarly, the first leg 838 and the second leg 840 abut the third cam 314 on the first camshaft 304 and the third cam 314 on the second camshaft 306, respectively.

Referring back to FIG. 2, the machine 106 may further include one or more second linear guides 236a and 236b that may be mounted on the first support bar 220c along the third axis 234. In an example embodiment, the one or more second linear guides 236a and 236b may have a structure similar to the first linear guide 226.

In some examples, the separator wall frame 206 may be movably mounted on the main frame 202 through the one or more second linear guides 236a and 236b. Similar to the movable frame 204, the separator wall frame 206 may be movable along the third axis 234. The structure of the separator wall frame 206 is further described in conjunction with FIG. 9.

Figure 9:
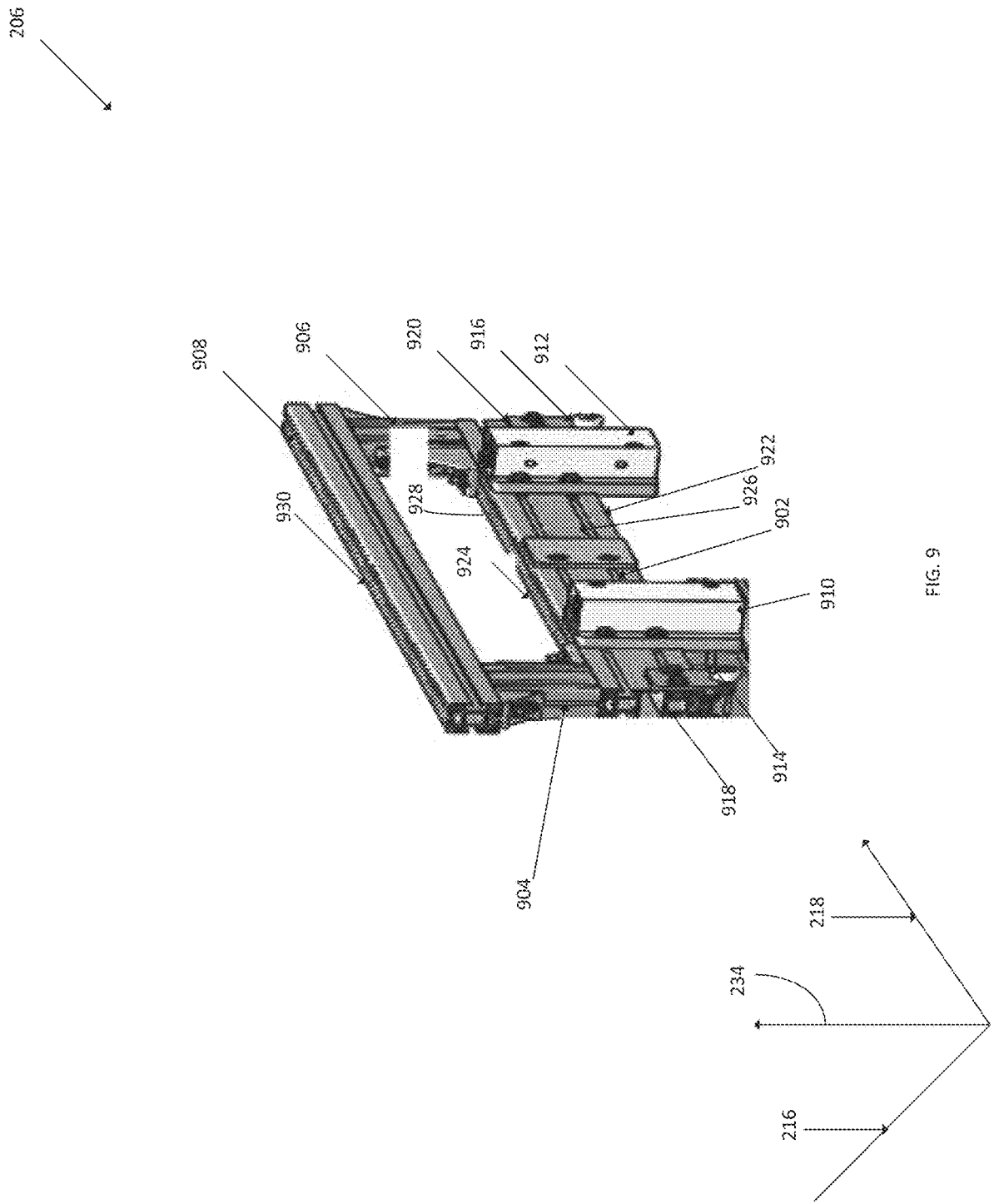
FIG. 9 illustrates a perspective view of a separator wall frame, according to one or more embodiments.

FIG. 9 illustrates a perspective view of the separator wall frame 206, according to one or more embodiments described herein. In an example embodiment, the separator wall frame 206 includes a wall frame beam 902, a first vertical support beam 904, a second vertical support beam 906, a wall receptacle 908, a first channel 910, a second channel 912, a fifth leg 914, and a sixth leg 916. The wall frame beam 902 is positioned along the second axis 218 and has a first end 918 and a second end 920 along the second axis 218. Further, the wall frame beam 902 includes a third end 922 and a fourth end 924 along the third axis 234. Additionally, the wall frame beam 902 has a first surface 926 and a second surface 928.

In some examples, a first channel 910 and the second channel 912 may be coupled to the wall frame beam 902 on the first surface 926 of wall frame beam 902. In some examples, the first channel 910 and the second channel 912 may be configured to receive the one or more second linear guides 236a and 236b, when the separator wall frame 206 is mounted on the main frame 202. Additionally, on the first surface 926 of the wall frame beam 902, the fifth leg 914 and the sixth leg 916 may be mounted at the first end 918 of the wall frame beam 902 and the second end 920 of the wall frame beam 902, respectively. In an example embodiment, the fifth leg 914 and the sixth leg 916 may extend beyond the third end 922 of the wall frame beam 902 along the third axis 234. In some examples, the fifth leg 914 and the sixth leg 916 may abut the second cam 312 on the first camshaft 304 and the second camshaft 306, respectively, when the separator wall frame 206 is installed on the one or more second linear guides 236a and 236b on the main frame 202.

In an example embodiment, the first vertical support beam 904 and the second vertical support beam 906 are fixedly coupled to the fourth end 822 of the wall frame beam 902. Further, the first vertical support beam 904 and the second vertical support beam 906 extend along the third axis 234. Further, the wall receptacle 908 is fixedly mounted on the first vertical support beam 904 and the second vertical support beam 906 such that a long edge 930 of the wall receptacle 908 extends along the second axis 218.

Referring back to FIG. 2, in an example embodiment, the movable frame 204 and the separator wall frame 206 may be utilized to mount a first package translation component and a second package translation component, respectively, on the machine 106. In an example embodiment, the first package translation component and the second package translation component may correspond to components that may facilitate movement of the package between various sub-systems of the material handling system 100. Some examples of the first package translation component and the second package translation component may include, but are not limited to, a pop-up belt and separator wall. The machine 106 assembled with the pop-up belt and the separator wall is further illustrated in FIG. 10.

Figure 10:
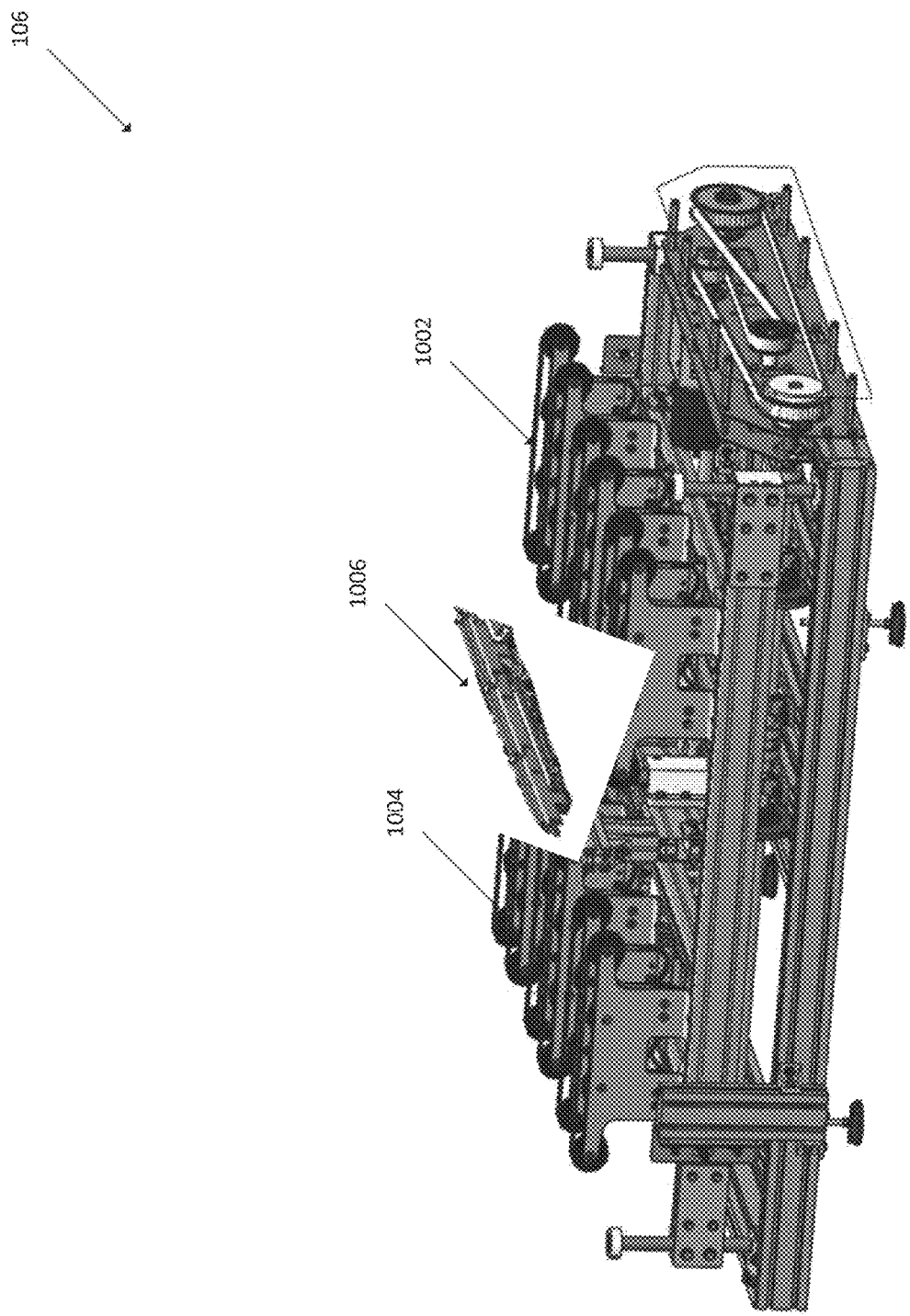
FIG. 10 illustrates another perspective view of the machine, according to one or more embodiments.

FIG. 10 illustrates another perspective view of the machine 106, according to one or more embodiments. Referring to FIG. 10, the machine 106 further includes a first pop-up belt 1002, a second pop-up belt 1004, and a separator wall 1006. The first pop-up belt 1002 and the second pop-up belt 1004 may be coupled to the movable frame 204. In some examples, the first pop-up belt 1002 may be coupled to the second support bars 806c and 806d on the movable frame 204. Further, the second pop-up belt 1004 may be coupled to the second support bars 806a and 806b. In some examples, the first pop-up belt 1002 and the second pop-up belt 1004 may be further coupled to the second actuation unit 210.

Additionally, the second actuation unit 210 may be mounted on the movable frame 204. In some examples, the second actuation unit 210 may be configured to actuate the first pop-up belt 1002 and the second pop-up belt 1004. The structure of the first pop-up belt 1002 and the second pop-up belt 1004 is further described in conjunction with FIG. 11.

In an example embodiment, the separator wall 1006 may be coupled to the separator wall frame 206. For example, the separator wall 1006 may be coupled to the wall receptacle 908 of the separator wall frame 206. The structure of the separator wall 1006 is described further in conjunction with FIG. 12.

Figure 11:
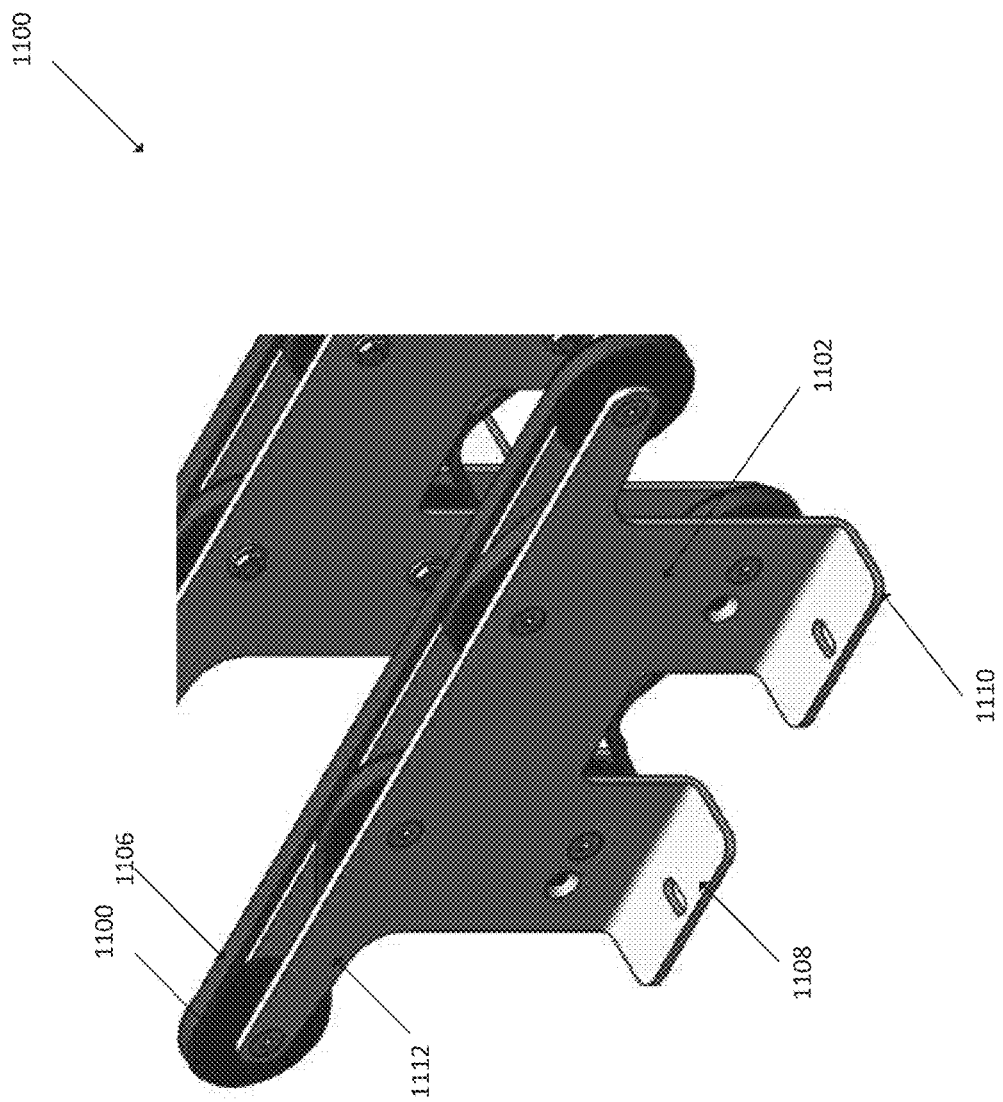
FIG. 11 illustrates a perspective view of an example pop-up belt, according to one or more embodiments.

FIG. 11 illustrates a perspective view of an example pop-up belt 1100, according to one or more embodiments described herein. The example pop-up belt 1100 includes a bracket 1102, a plurality of pulleys 1104, and a second belt 1106. The bracket 1102 may include a seventh leg 1108 and an eighth leg 1110. In some examples, the seventh leg 1108 and the eighth leg 1110 of the bracket 1102 enable coupling of the example pop-up belt 1100 on the plurality of second support bars 1006a, 1006b, 1006c, and 1006d.

Further, the bracket includes an elongated arm 1112. In some examples, the plurality of pulleys 1104 are coupled to the elongated arm 1112. Further, the second belt 1106 is wrapped around the plurality of pulleys 1104. Further, the example pop-up belt 1100 may be to the movable frame 204 such that the elongated arm 1112 of the example pop-up belt 1100 extends along the first conveyance axis 118. Accordingly, the second belt 1106 also extends along the first conveyance axis 118.

A person having ordinary skills in the art would appreciate that the first pop-up belt 1002 and the second pop-up belt 1004 may have similar structure as that of the example pop-up belt 1100.

Figure 12:
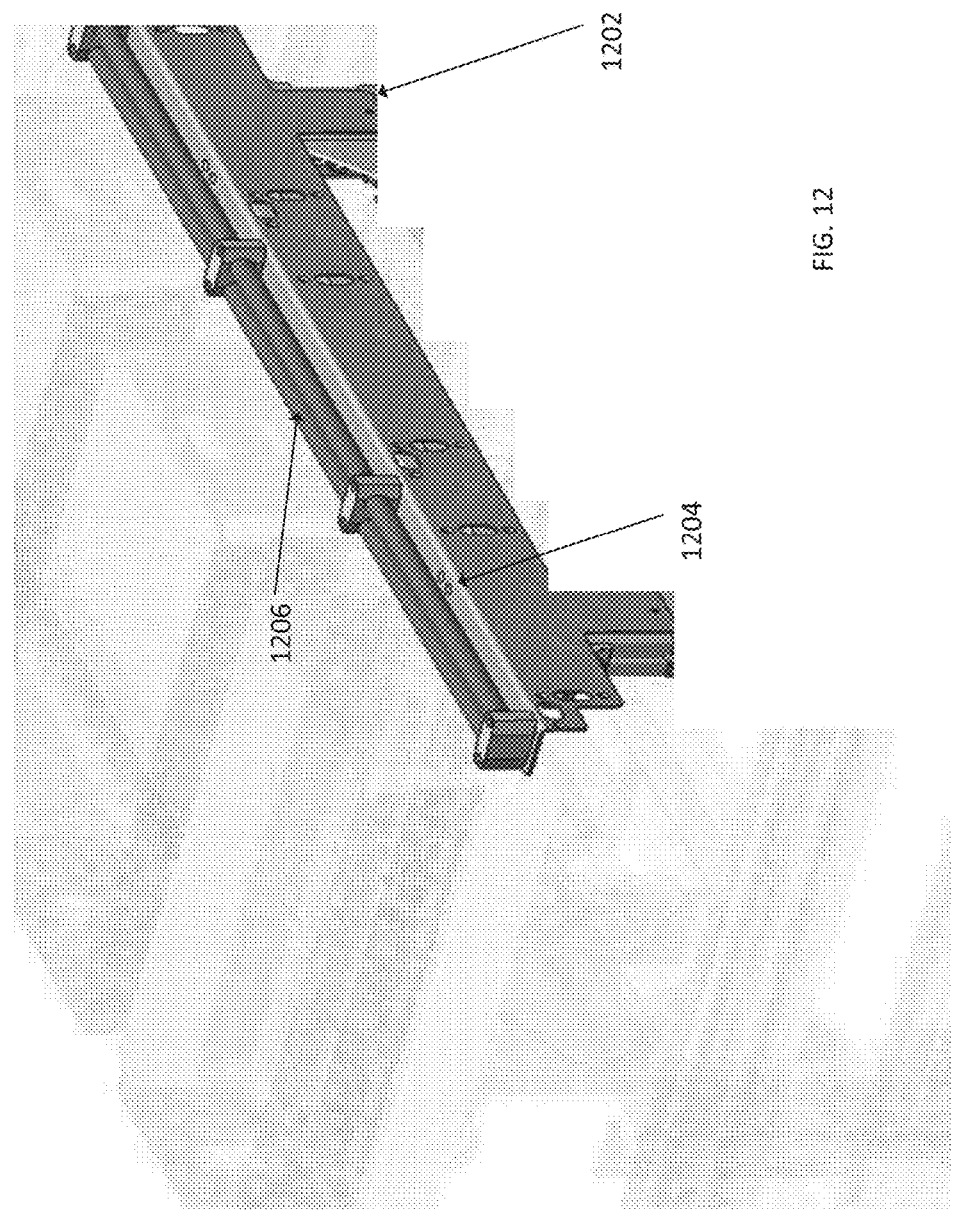
FIG. 12 illustrates a perspective view of a separator wall, according to one or more embodiments.

FIG. 12 illustrates a perspective view of the separator wall 1006, according to one or more embodiments. In an example embodiment, the separator wall 1006 may include a first end 1202, a second end 1204, and a set of passive rollers 1206. The first end 1202 may be configured to be coupled to the separator wall frame 206. The second end 1204 may be configured to receive the set of passive rollers 1206. In an example embodiment, the set of passive rollers 1206 are configured to facilitate the movement of the package along the first conveyance axis 118, as is further described in conjunction with FIGS. 14, and 18-20.

Referring back to FIG. 1, the control system 107 may be configured to control the operation of the material handling system 100. For example, the control system 107 may be configured to control the operation of the first conveyor 110, the second conveyor 134, and the machine 106. The structure of the control system 107 is described in conjunction with FIG. 13.

Figure 13:
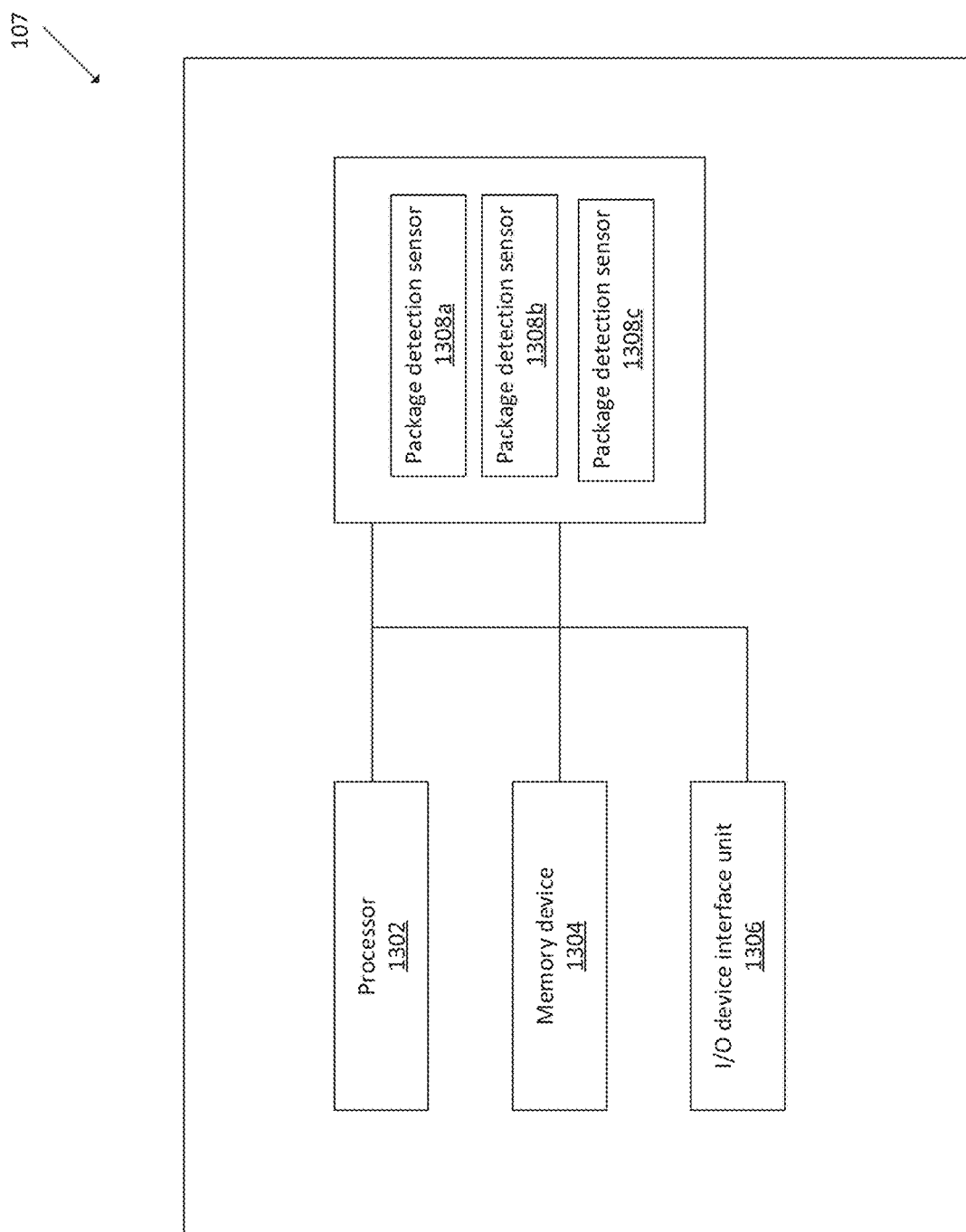
FIG. 13 illustrates a block diagram of a control system, in accordance with one or more embodiments.

FIG. 13 illustrates a block diagram of the control system 107, in accordance with one or more embodiments described herein. The control system 107 includes a processor 1302, a memory device 1304, an input/output (I/O) device interface unit 1306, and one or more package detection sensors 1308a, 1308b, and 1308c. In an example embodiment, the processor 1302 is communicatively coupled to the memory device 1304, the I/O device interface unit 1306, and the one or more package detection sensors 1308a 1308b, and 1308c.

The processor 1302 may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 13 as a single processor, in an embodiment, the processor 1302 may include a plurality of processors and signal processing modules. The plurality of processors may be embodied on a single electronic device or may be distributed across a plurality of electronic devices collectively configured to function as the circuitry of the material handling system 100. The plurality of processors may be in operative communication with each other and may be collectively configured to perform one or more functionalities of the circuitry of the material handling system 100, as described herein. In an example embodiment, the processor 1302 may be configured to execute instructions stored in the memory device 1304 or otherwise accessible to the processor 1302. These instructions, when executed by the processor 1302, may cause the circuitry of the material handling system 100 to perform one or more of the functionalities, as described herein.

Whether configured by hardware, firmware/software methods, or by a combination thereof, the processor 1302 may include an entity capable of performing operations according to embodiments of the present disclosure while configured accordingly. Thus, for example, when the processor 1302 is embodied as an ASIC, FPGA or the like, the processor 1302 may include specifically configured hardware for conducting one or more operations described herein. Alternatively, as another example, when the processor 1302 is embodied as an executor of instructions, such as may be stored in the memory device 1304, the instructions may specifically configure the processor 1302 to perform one or more algorithms and operations described herein.

Thus, the processor 1302 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 1304 may include suitable logic, circuitry, and/or interfaces that are adapted to store a set of instructions that is executable by the processor 1302 to perform predetermined operations. Some of the memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the memory device 1304 may be integrated with the processor 1302 on a single chip, without departing from the scope of the disclosure. In an example embodiment, the memory device 1304 is configured to store a first set of pre-stored features and a second set of pre-stored features. In some examples, the first set of pre-stored features corresponds to unique features of a first type of package. Further, the second set of pre-stored features corresponds to unique features of a second type of package. In an example embodiment, the first set of pre-stored features and the second set of pre-stored features may correspond to Scale Invariant Feature Transform (SIFT) descriptors that are used to uniquely identify an object (e.g., the first type of package and the second type of package).

The I/O device interface unit 1306 may include suitable logic, circuitry, and/or interfaces that are adapted to transmit and received information from one or more components of the material handling system 100. For example, the I/O device interface unit 1306 may be configured to send/receive messages to/from, the one or more package detection sensors 1308a, 1308b, and 1308c, the first actuation unit 208, and the second actuation unit 210. In an example embodiment, the I/O device interface unit 1306 may be configured to communicate with the one or more components, in accordance with one or more device communication protocols such as, but not limited to, I2C communication protocol, Serial Peripheral Interface (SPI) communication protocol, serial communication protocol, Control Area Network (CAN) communication protocol, and 1-Wire® communication protocol. Some examples of the input/output interface unit 306 may include, but not limited to, a Data Acquisition (DAQ) card, an electrical drives driver circuit, and/or the like.

The one or more package detection sensors 1308a, 1308b, and 1308c may include suitable logic/circuitry that may enable the package detection sensors 1308a, 1308b, and 1308c to detect whether the package is present at one or more predetermined locations such as on the first conveyor 110, platform 114, and/or the second conveyor 134. For example, the package detection sensor 1308a may be positioned on the platform 114 to determine whether the package is present on the platform 114. Similarly, the package detection sensor 1308b may be positioned proximal to the first conveyor 110 to determine whether the package is located on the first conveyor 110. In another example, the package detection sensor 1308c may be located proximal to the second conveyor 134 to determine the presence of the package on the second conveyor 134. Some examples of the one or more package detection sensors 1308a, 1308b, and 1308c may include, but are not limited to an infrared (IR) sensor, an image capturing device, a proximity sensor, and/or the like.

Figure 14:
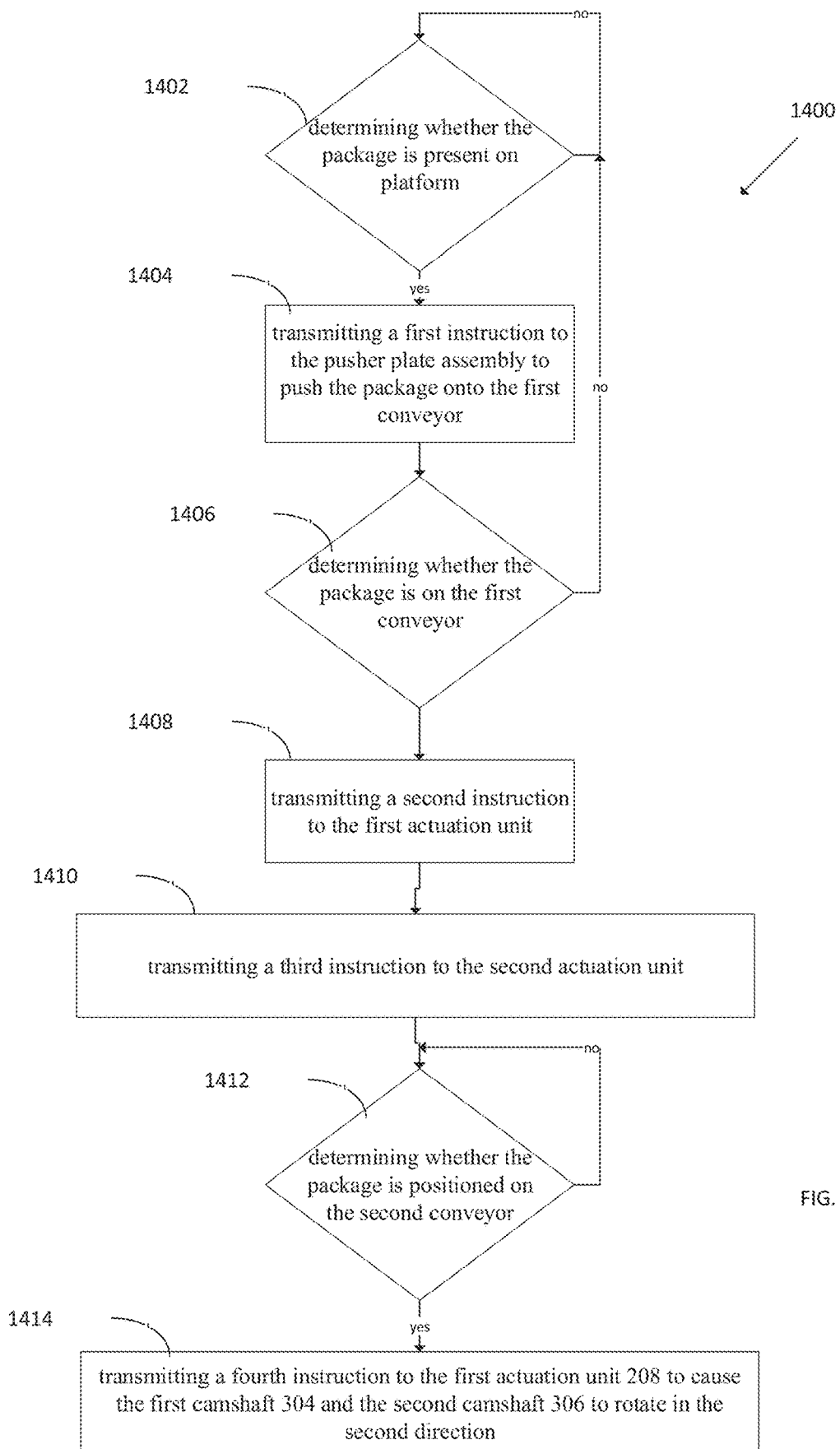
FIG. 14 illustrates a flowchart of a method for operating a material handling system, according to one or more embodiments.

The operation of the control system 107 is further described on conjunction with FIG. 14.

Figure 24:
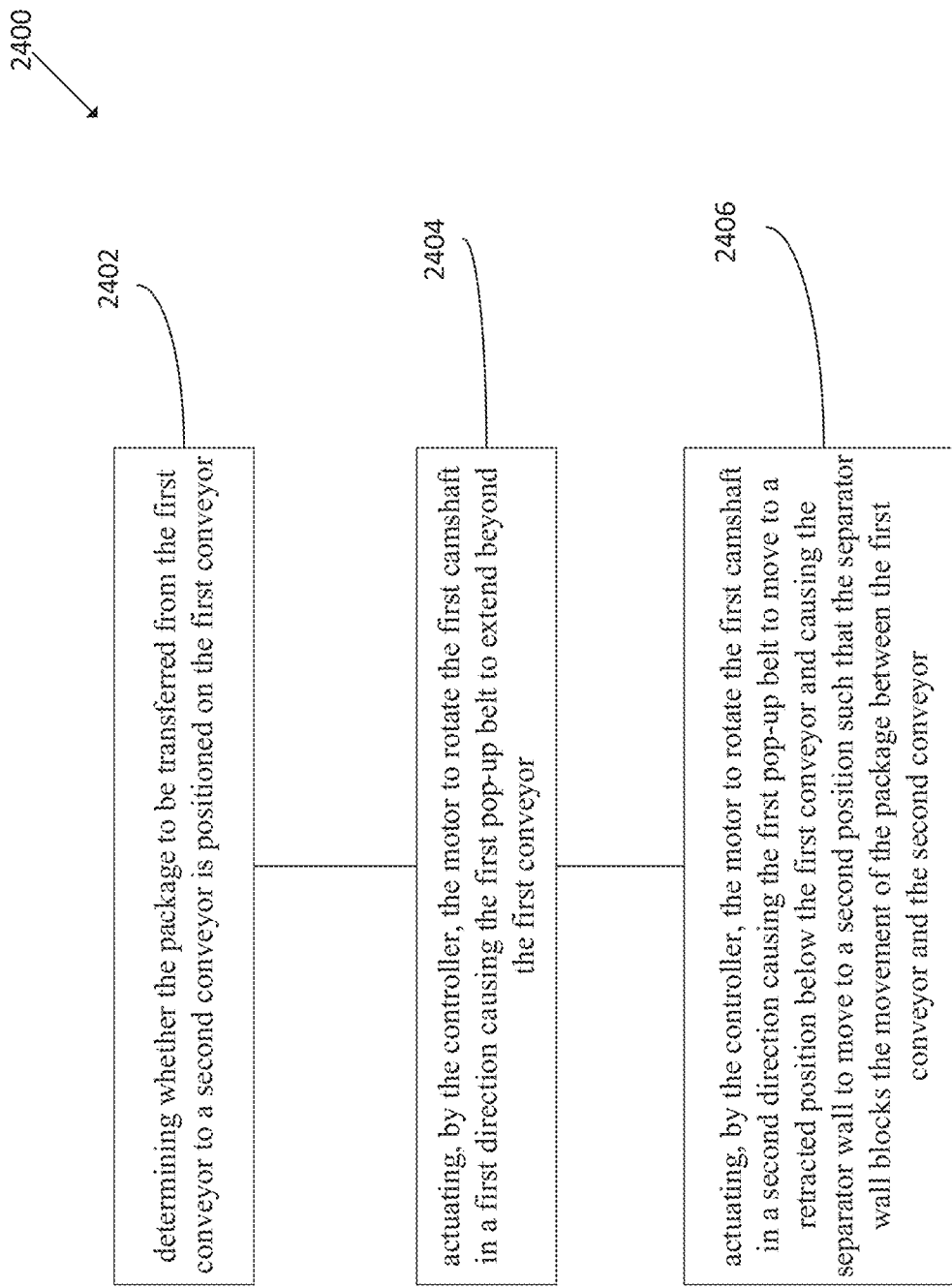
FIG. 24 illustrates a flowchart of a method for operating the material handling system, according to one or more embodiments.

FIGS. 14 and 24 illustrate example flowcharts of the operations performed by an apparatus, such as the control system 107 of FIG. 1, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations FIGS. 14 and 24, when executed, convert a computer or processing circuitry into a particular machine configured to perform an example embodiment of the present invention. Accordingly, the operations of FIGS. 14 and 24 define algorithms for configuring one or more computers or processors to perform various example embodiments. In some cases, a general purpose computer may be provided with an instance of the processor which performs the algorithms of FIGS. 14 and 24 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

FIG. 14 illustrates a flowchart 1400 of a method for operating the material handling system 100, according to one or more embodiments. The flowchart 1400 is described in conjunction with FIGS. 1-13.

At step 1402, the material handling system 100 includes means such as the control system 107, the processor 1302, the I/O device interface unit 1306 and/or the like for determining whether the package is present on platform 114. In an example embodiment, the I/O device interface unit 1306 may utilize the package detection sensor 1308*a* positioned proximal to the platform 114 to determine whether the package is present on the platform 114. For example, the I/O device interface unit 1306 may receive a first package presence signal from the package detection sensor 1308*a*, when the package is present on the platform 114.

As discussed, the package detection sensor 1308*a* may correspond to an IR sensor. In such an implementation, the IR sensor may be configured to generate the first package presence signal. In an example embodiment, the IR sensor may include an IR transmitter and an IR receiver. The IR transmitter may be configured to generate the IR signal. When package is not present on the platform 114, the IR receiver may not receive the IR signal generated by the IR transmitter. However, when the package is present on the platform 114, the IR signal from the IR transmitter may reflect from the surface of the package back to the IR receiver. In response to receiving the reflected IR signal, the IR receiver may generate the first package presence signal.

In an example embodiment, if the I/O device interface unit 1306 determines that the package is present on the platform 114, the processor 1302 may be configured to perform the step 1404. However, if the I/O device interface unit 1306 determines that the package is not present on the platform 114, the processor 1302 may be configured to repeat the step 1402.

In response to receiving the first package presence signal, at step 1404, the material handling system 100 includes means such as the control system 107, the processor 1302, the I/O device interface unit 1306, and/or the like for transmitting a first instruction to the pusher plate assembly 112 to push the package onto the first conveyor 110. In an example embodiment, the pusher plate assembly 112 may be configured to actuate the pusher plate 132 to push the package on the first conveyor 110, based on the reception of the first instruction. As discussed, the pusher plate 132 may be actuated using a servo motor or using a hydraulic system. Accordingly, the pusher plate assembly 112 may be configured to actuate the servo motor or the hydraulic system to cause the pusher plate 132 to push the package onto the first conveyor 110.

In an alternate embodiment, where the first sub-system 102 does not include the pusher plate assembly 112, the I/O device interface unit 1106 may be configured to actuate the perpendicular belts 109 on the platform 114. Actuating the perpendicular belts 109 causes the package to move along the second conveyance axis 124 onto the first conveyor 110.

At step 1406, the material handling system 100 includes means such as the control system 107, the processor 1302, the I/O device interface unit 1306, and/or the like for determining whether the package is on the first conveyor 110. In an example embodiment, the I/O device interface unit 1306 may be configured to utilize the package detection sensor 1308*b* to determine whether the package is on the first conveyor 110. For example, the I/O device interface unit 1306 may receive a second package presence signal, indicative of the presence of the package, from the package detection sensor 1308*b*. Accordingly, the I/O device interface unit 1306 may determine that the package is present on the first conveyor 110. Subsequently, the processor 1302 may perform the step 1408. However, if the I/O device interface unit 1306 determines that the package is not present on the first conveyor 110, the processor 1302 may be configured to repeat the step 1402.

At step 1408, the material handling system 100 includes means such as the control system 107, the processor 1302, the I/O device interface unit 1306, and/or the like, for transmitting a second instruction to the first actuation unit 208. In an example embodiment, in response to receiving the second instruction, the first actuation unit 208 may cause the motor 302 to rotate the first camshaft 304 and the second camshaft 306 in the first direction. As discussed, the first direction corresponds to the clockwise rotation of the first camshaft 304 and the second camshaft 306. The rotation of the first camshaft 304 and the second camshaft 306 causes the first cam 310, the second cam 312, and the third cam 314 to rotate, which further causes the movable frame 204 and the separator wall frame 206 to translate along the third axis 234.

In some examples, because the movable frame 204 and the separator wall frame 206 are coupled to different cams on the first camshaft 304 and the second camshaft 306, therefore, the direction of the translation of the movable frame 204 and the separator wall frame 206 is different. For example, as discussed above, the movable frame 204 abuts the first cam 310 and the third cam 314 on the first camshaft 304 and second camshaft 306, while the separator wall frame 206 is coupled to the second cam 312. Further, as discussed, the orientation of the second cam 312 is different from the first cam 310 and the third cam 314. For instance, when the point A (depicted by 512) of the first cam 310 and the third cam 314 abut the movable frame 204, point B (depicted by 514) abuts the separator wall frame 206. Accordingly, when the first camshaft 304 and the second camshaft 306 rotates in the first direction, the first cam 310 and the third cam 314 rotates from point A (depicted by 512) to point B (depicted by 512), while the second cam rotates from point B (depicted by 514) to point A (depicted by 512). Since the radius of the cam wheel 504 at the point A (depicted by 512) is less than the radius of the cam wheel 504 at point B (depicted by 514), therefore, when the first camshaft 304 and second camshaft 306 rotate in the first direction, the movable frame 204 translate in an upward direction, along the third axis 234, while the separator wall frame 206 translates in a downward direction, along the third axis 234.

Since the first pop-up belt 1002 and the second pop-up belt 1004 are coupled to the movable frame 204, therefore, when the movable frame 204 translates in the upward direction, the first pop-up belt 1002 and the second pop-up belt 1004 may extend out from the first conveyor 110 and the second conveyor 134, respectively. In some examples, the first pop-up belt 1002 and the second pop-up belt 1004 may extend up through the gap 130 and the one or more slots 142 in the first conveyor 110 and the second conveyor 134, respectively. Further, since the separator wall 1006 is coupled to the separator wall frame 206, therefore, when the separator wall frame 206 translates in the downward direction (when the first camshaft 304 and second camshaft 306 rotates in the first direction), the separator wall 1006 also translates in the downward direction. In some examples, the first pop-up belt 1002, the second pop-up belt 1004, and the separator wall 1006 may translates in their respective directions until the second belt 1106 on the first pop-up belt 1002 and the second pop-up belt 1004, and the set of passive rollers 1206 are in a same plane. For example, the first camshaft 304 and the second camshaft 306 are rotated by a predetermined angular displacement. In an example embodiment, the predetermined angular displacement may correspond to amount by which the first camshaft 304 and second camshaft 306 are rotated (in the first direction) to bring the second belt 1106 on the first pop-up belt 1002 and the second pop-up belt 1004, and the set of passive rollers 1206 in a same plane. In an example embodiment, the after the first camshaft 304 and second camshaft 306 are rotated by the predetermined angular displacement, the first pop-up belt 1002 and the second pop-up belt 1004 are in the extended position. Further, the separator wall 1006 is in a first position. The translation of the first pop-up belt 1002, the second pop-up belt 1004, and the separator wall 1006 is further illustrated through FIGS. 15-17.

Figure 15:
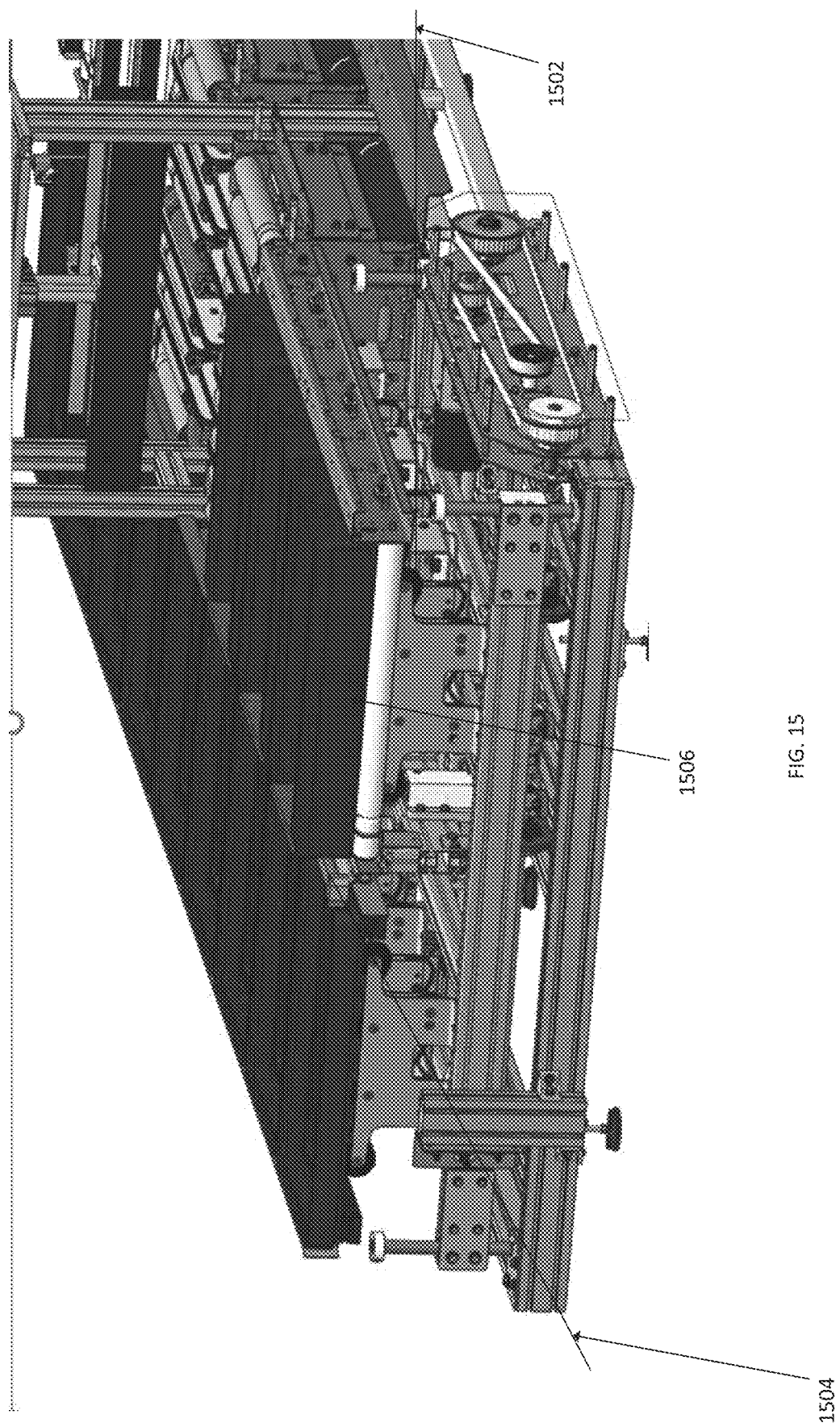
FIG. 15 illustrates a perspective view of the machine in a first state, according to one or more embodiments.

Referring to FIG. 15, it can be observed that the first pop-up belt 1002 and the second pop-up belt 1004 are at a retracted position 1502 below the first conveyor 110 and the second conveyor 134, respectively. Further, referring to FIG. 15, the separator wall 1006 is at a second position 1504, which is above the position of the first conveyor 110 and the second conveyor 134. Accordingly, it can be observed that the separator wall 1006 blocks the movement of the package 1506 between the first conveyor 110 and the second conveyor 134.

Figure 16:
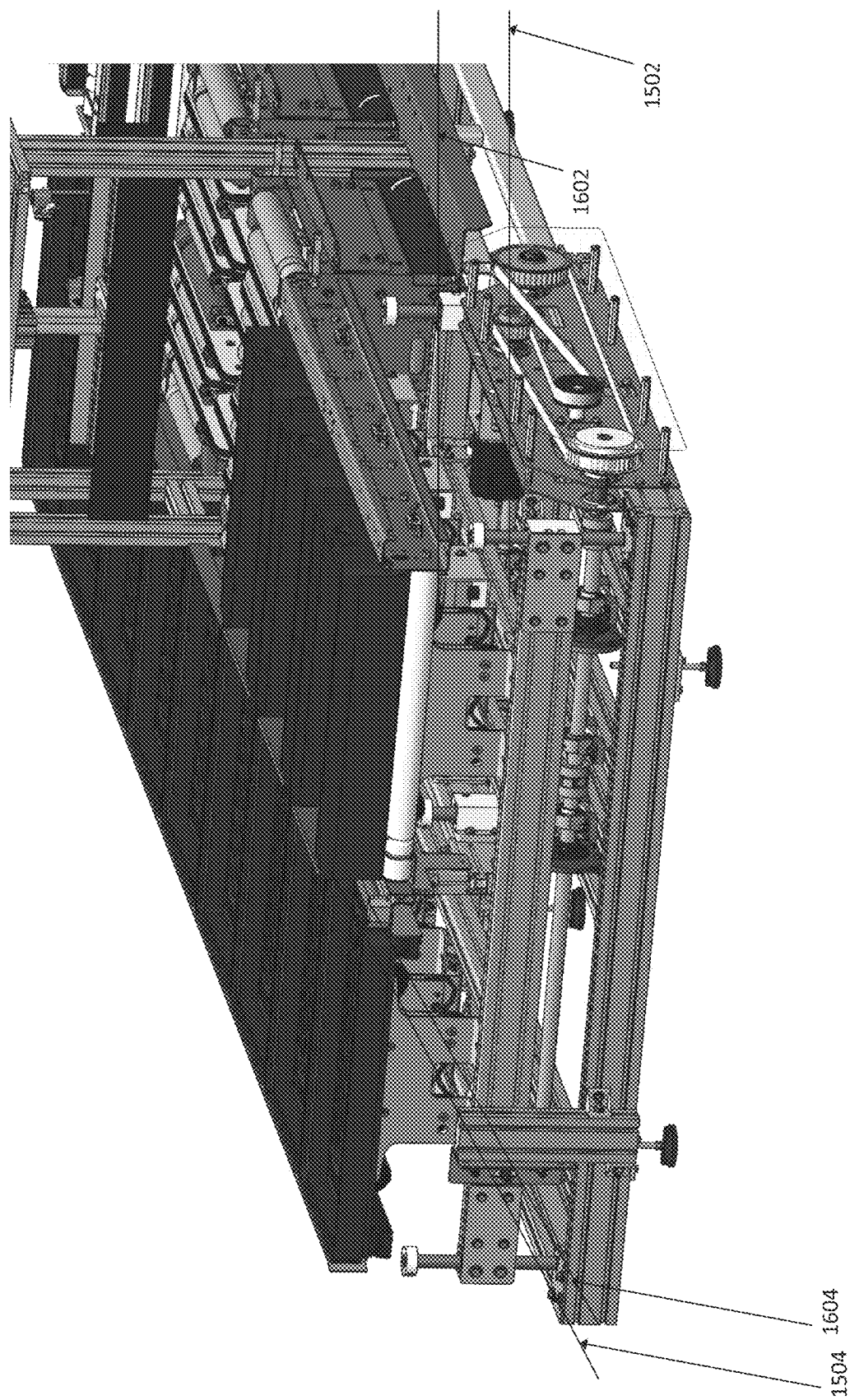
FIG. 16 illustrates a perspective view of the machine in a second state, according to one or more embodiments.

Referring to FIG. 16, it can be observed that the first pop-up belt 1002 and the second pop-up belt 1004 are at a third position 1602 below the first conveyor 110 and the second conveyor 134, respectively. Further, the third position 1602 is higher in comparison to the retracted position 1502. Further, it can be observed that the separator wall 1006 is at a fourth position 1604, which is below the second position 1504.

Figure 17:
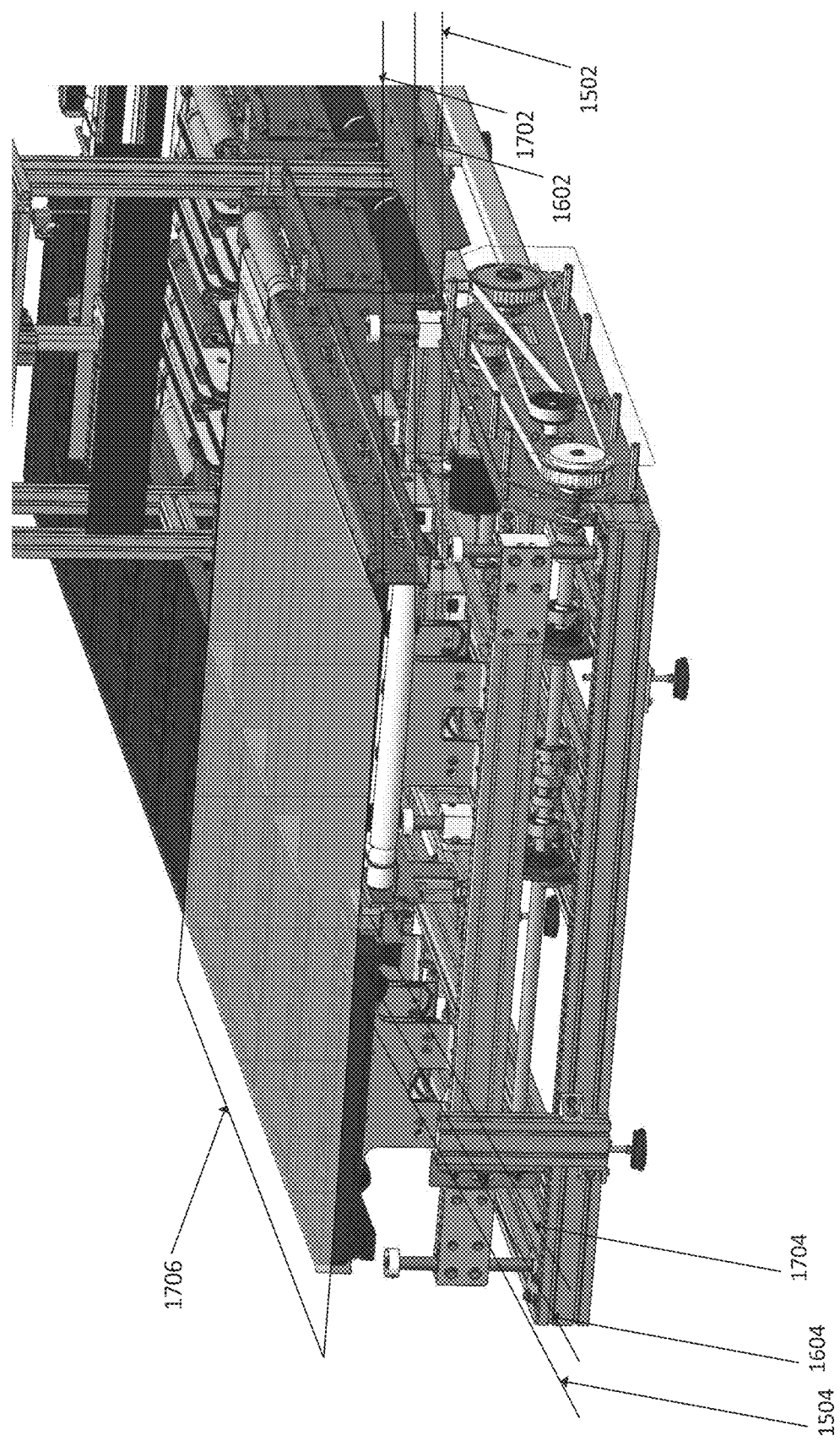
FIG. 17 illustrates a perspective view of the machine in a third state, according to one or more embodiments.

Referring to FIG. 17, it can be observed that the first pop-up belt 1002 and the second pop-up belt 1004 are in an extended position 1702. Further, the separator wall 1006 is at the first position 1704, which is below the fourth position 1604. Further, it can be observed that the second belt 1106 of the first pop-up belt 1002 and the second pop-up belt 1004 are in a same plane (depicted by 1706) as that of the set of passive rollers 1206. Furthermore, it can be observed that the first pop-up belt 1002 and the second pop-up belt 1004 are engaged with the package 1506 positioned on the first conveyor 110. In some examples, the first pop-up belt 1002 may be configured to lift the package 1506 above the first conveyor 110 (as can be observed from FIG. 17).

Referring back to FIG. 14, at step 1410, the material handling system 100 includes means such as the control system 107, the processor 1302, the I/O device interface unit 1306, and/or the like, for transmitting a third instruction to the second actuation unit 210. In an example embodiment, in response to receiving the third instruction, the second actuation unit 210 may cause the second belt 1106 on the first pop-up belt 1002 and the second pop-up belt to move in along the first conveyance axis 118. For example, the second actuation unit 210 may cause the plurality of pulleys 1104 to rotate causing the second belt 1106 to move along the first conveyance axis 118. Since the package is engaged with the first pop-up belt 1002, the movement of the second belt 1106 on the first pop-up belt 1002 causes the package to move along the first conveyance axis 118. Since the second belt 1106 on the first pop-up belt 1002 and the second pop-up belt 1004 are in the same plane as the set of passive rollers 1206 on the separator wall 1006, therefore, the package 1506 moves over the set of passive rollers 1206 on to the second pop-up belt 1004 (extending out from the second conveyor 134). Since the second belt 1106 on the second pop-up belt 1004 also move along the first conveyance axis 118, the second pop-up belt 1004 facilitates the movement of the package 1506 over the second conveyor 134.

Figure 18:
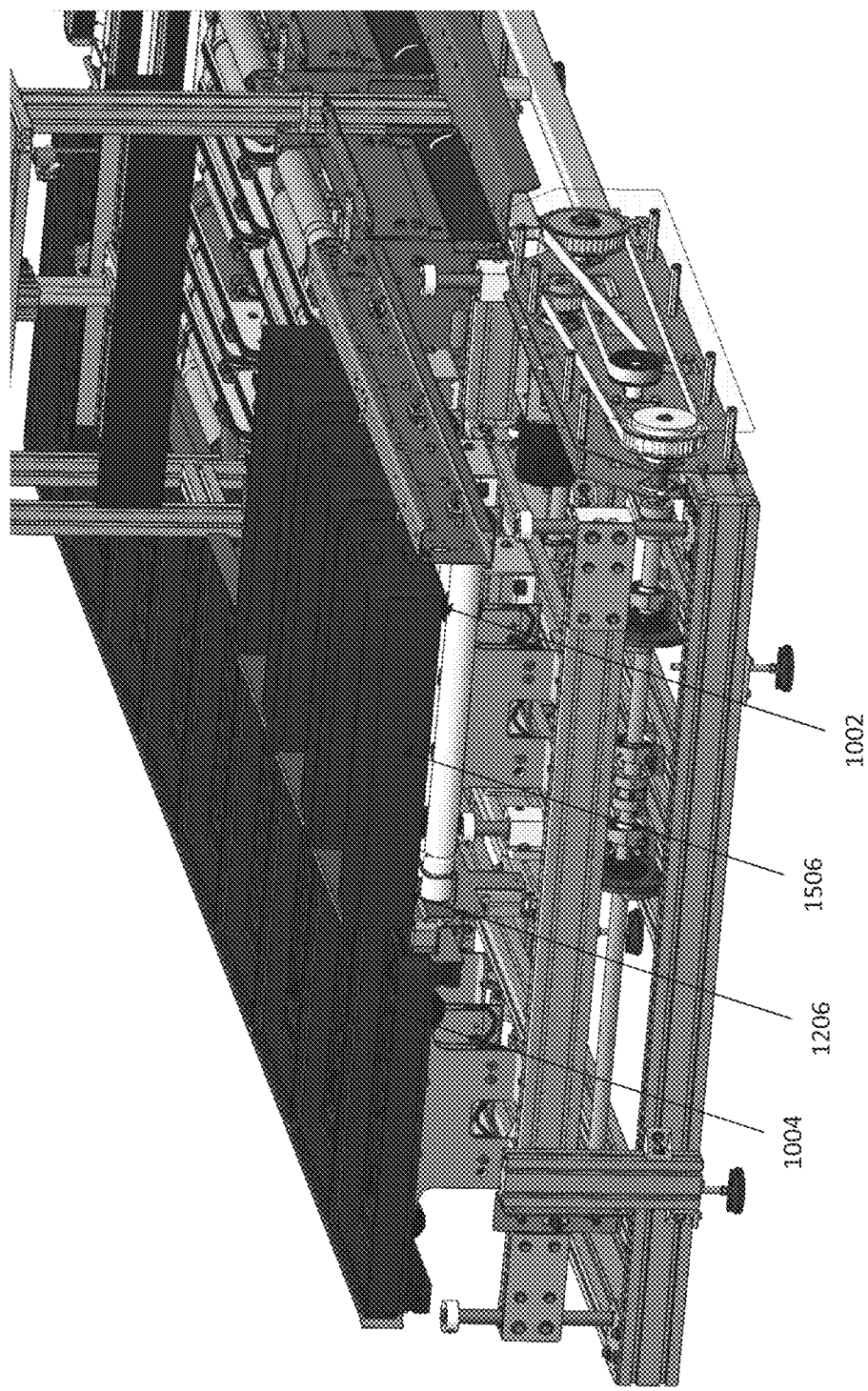
FIG. 18 illustrates a perspective view of the machine in a fourth state, according to one or more embodiments.
Figure 19:
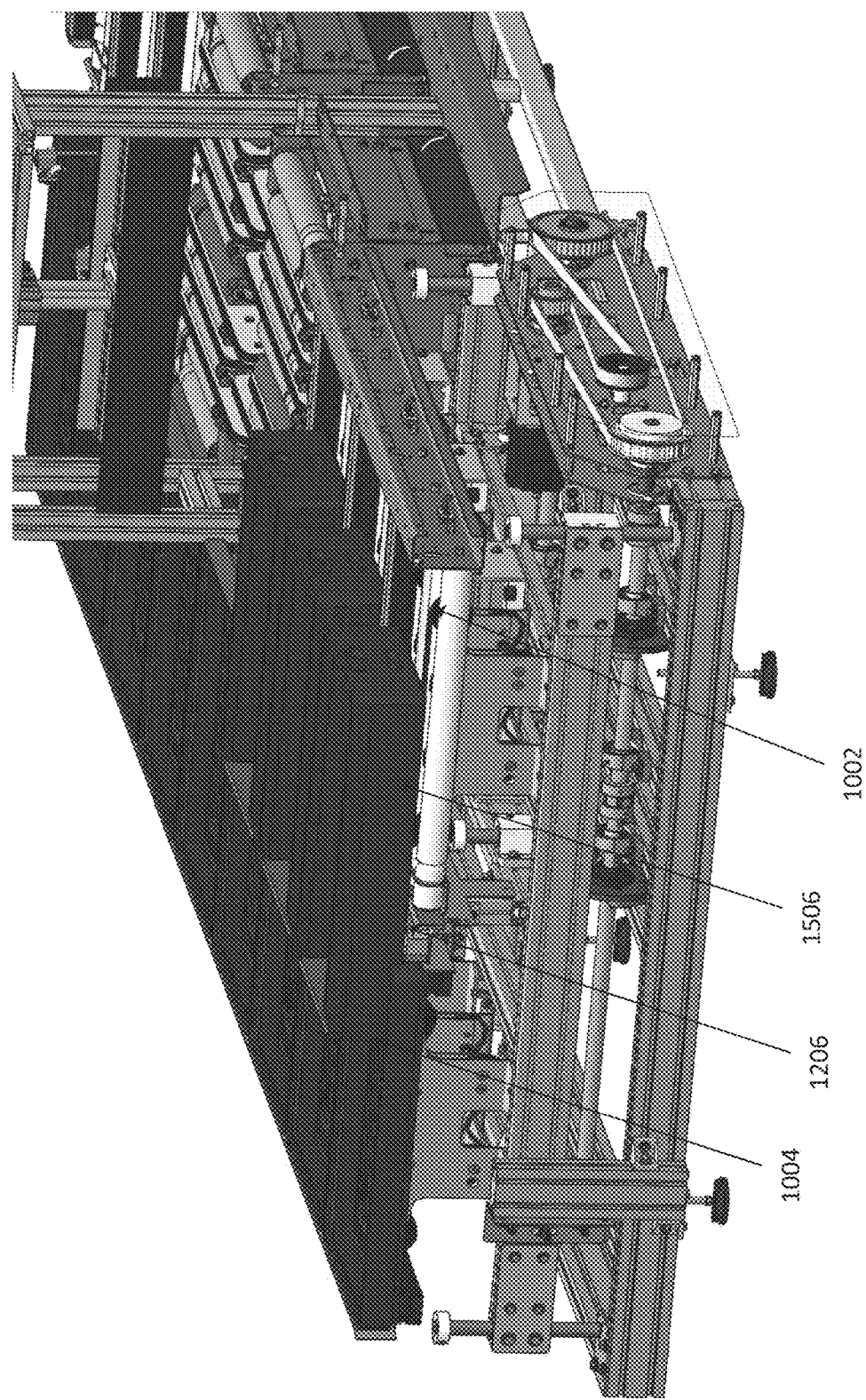
FIG. 19 illustrates a perspective view of the machine in a fifth state, according to one or more embodiments.
Figure 20:
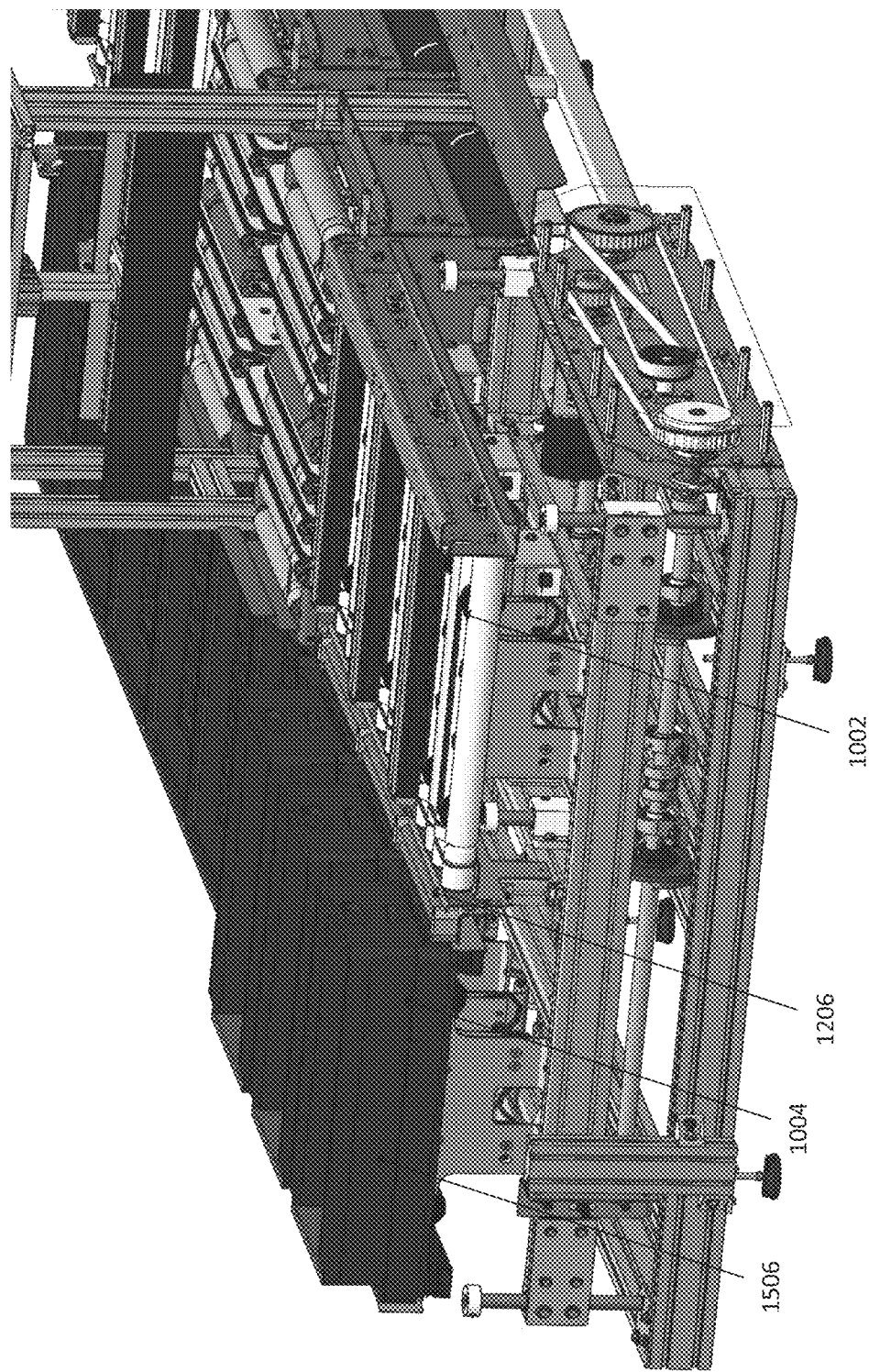
FIG. 20 illustrates a perspective view of the machine in a sixth state, according to one or more embodiments.

The movement of the package from the first conveyor 110 to the second conveyor 134 is illustrated through FIGS. 18-20. Referring to FIG. 18, it can be observed that the package 1506 translates along the first conveyance axis 118. Further, it can be observed that the package 1506 is positioned on the first pop-up belt 1002 and the set of passive rollers 1206. In some examples, the set of passive rollers 1206 rotate based on frictional force between the set of passive rollers 1206 and the surface of the package 1506. Referring to FIG. 19, it can be observed that the package 1506 has moved to a position such that the package 1506 is engaged with both the first pop-up belt 1002 and the second pop-up belt 1004. Further, it can be observed that the package 1506 move over the set of passive rollers 1206. Referring to FIG. 20, it can be observed that the package 1506 has been received by the second pop-up belt 1004 and is positioned over the second conveyor 134.

Referring back to FIG. 14, at step 1412, the material handling system 100 includes means such as the control system 107, the processor 1302, the I/O device interface unit 1306, and/or the like, for determining whether the package is positioned on the second conveyor 134. In an example embodiment, the I/O device interface unit 1306 may utilize the package detection sensor 1308c (positioned proximal on the second conveyor 134) to determine whether the package is positioned on the second conveyor 134. In some examples, the I/O device interface unit 1306 may determine that the package is positioned on the second conveyor 134 based on the reception of a third package presence signal from the package detection sensor 1308c. If the I/O device interface unit 1306 receives the third package presence signal from the package detection sensor 1308c, the processor 1302 may be configured to perform the step 1414. However, if the I/O device interface unit 1306 does not receive the third package presence signal, the processor 1302 may be configured to repeat the step 1412.

At step 1414, the material handling system 100 includes means such as the control system 107, the processor 1302, the I/O device interface unit 1306, and/or the like, for transmitting a fourth instruction to the first actuation unit 208 to cause the first camshaft 304 and the second camshaft 306 to rotate in the second direction. In an example embodiment, the second direction (i.e., anti-clockwise direction) is opposite to the first direction (i.e., clockwise direction). In response to receiving the fourth instruction, the first actuation unit 208 may cause the first camshaft 304 and the second camshaft 306 to rotate in the second direction. Rotating the first camshaft 304 and the second camshaft 306 in the second direction causes the first cam 310 and the third cam 314 to rotate from the point B (depicted by 514) to point A (depicted by 512). Further, the third cam rotates from point A (depicted by 512) to point B (depicted by 514). Accordingly, the separator wall 1006 move in the upward direction to the second position, where the separator wall 1006 extends out from the first conveyor 110 and the second conveyor 134 to block the movement of the package between the first conveyor 110 and the second conveyor 134. Concurrently, the first pop-up belt 1002 and the second pop-up belt 1004 retract below the first conveyor 110 and the second conveyor 134 to the retracted position, respectively.

Figure 21:
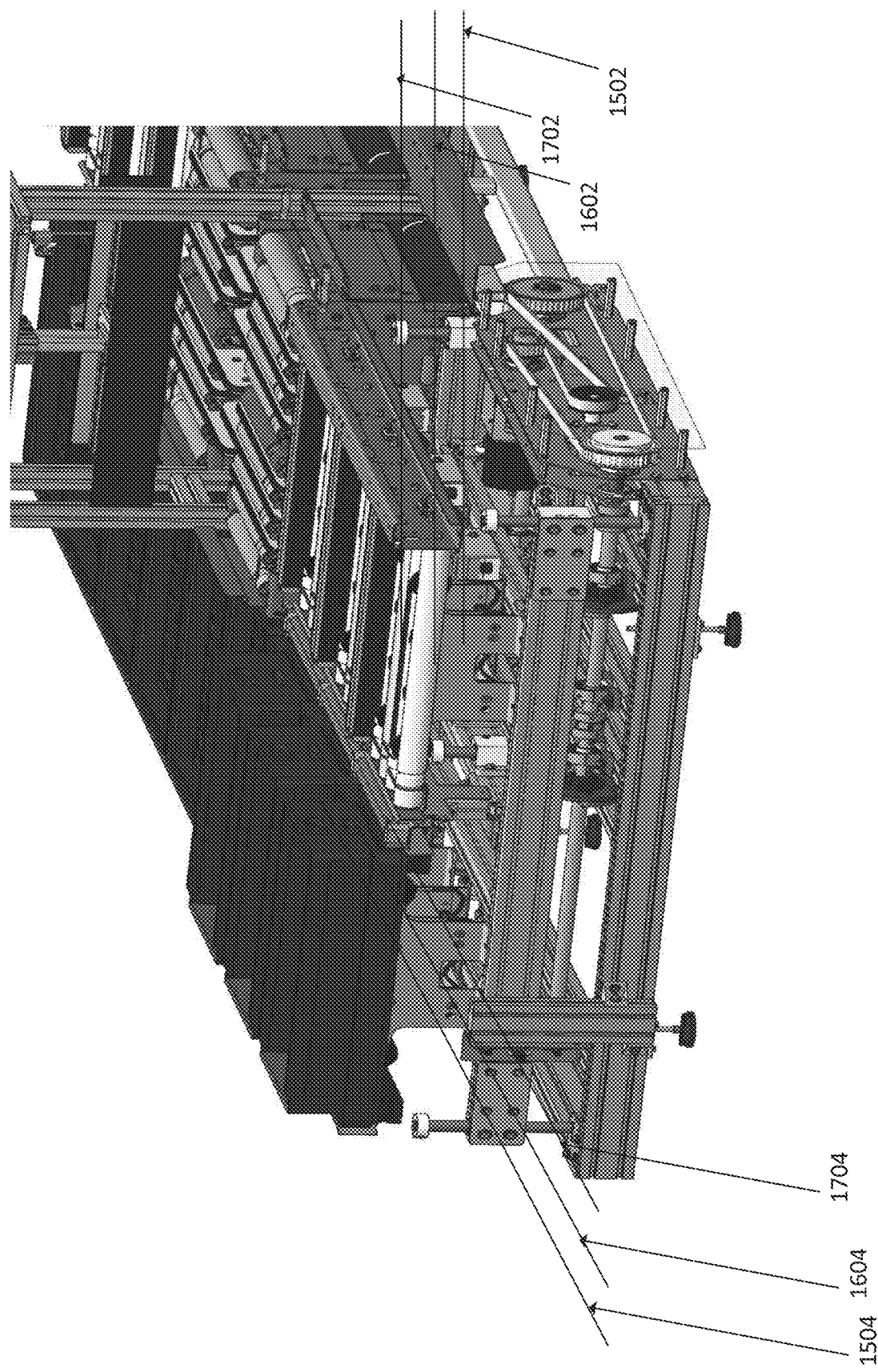
FIG. 21 illustrates a perspective view of the machine in a seventh state, according to one or more embodiments.
Figure 22:
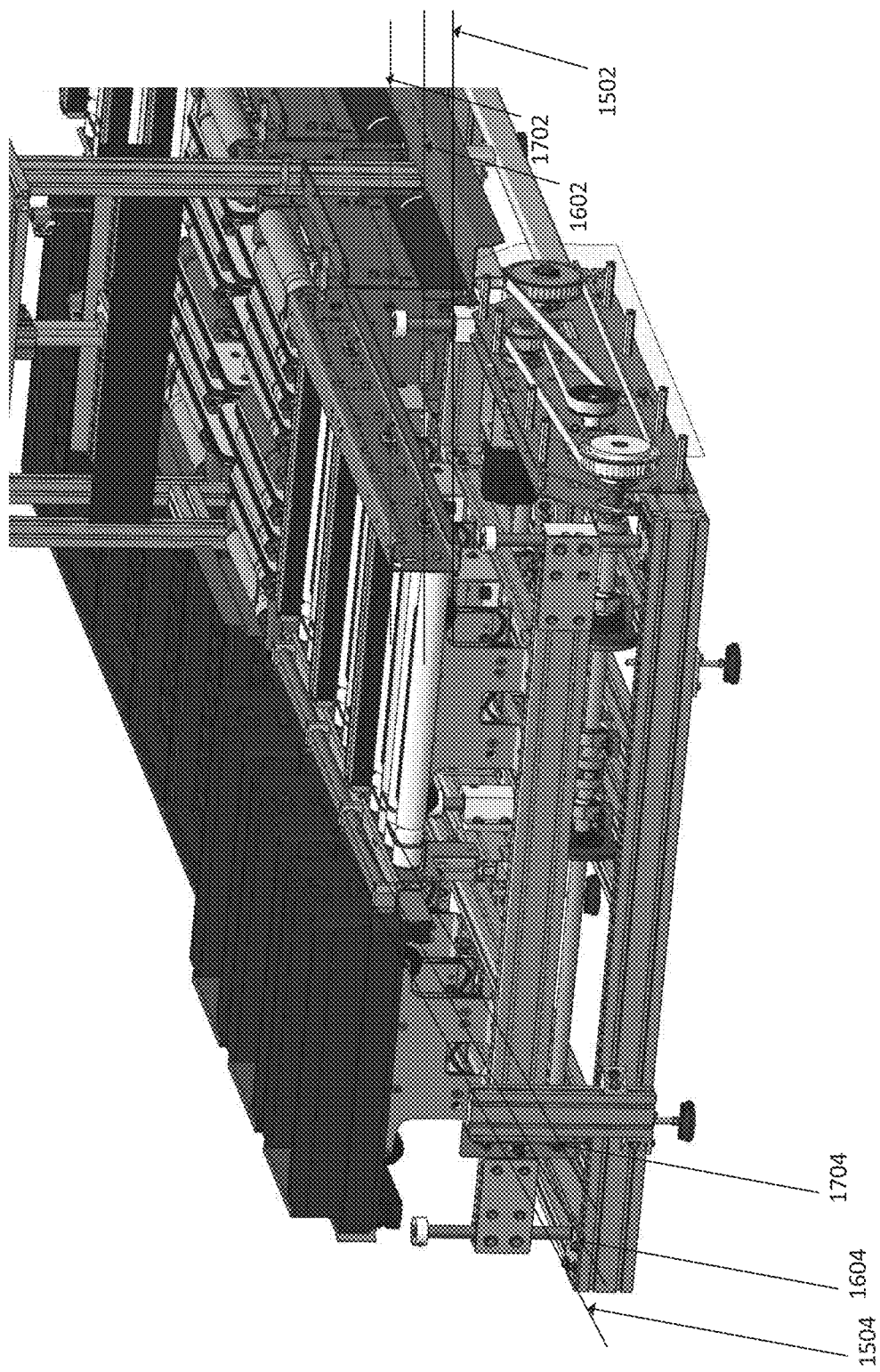
FIG. 22 illustrates a perspective view of the machine in an eighth state, according to one or more embodiments.
Figure 23:
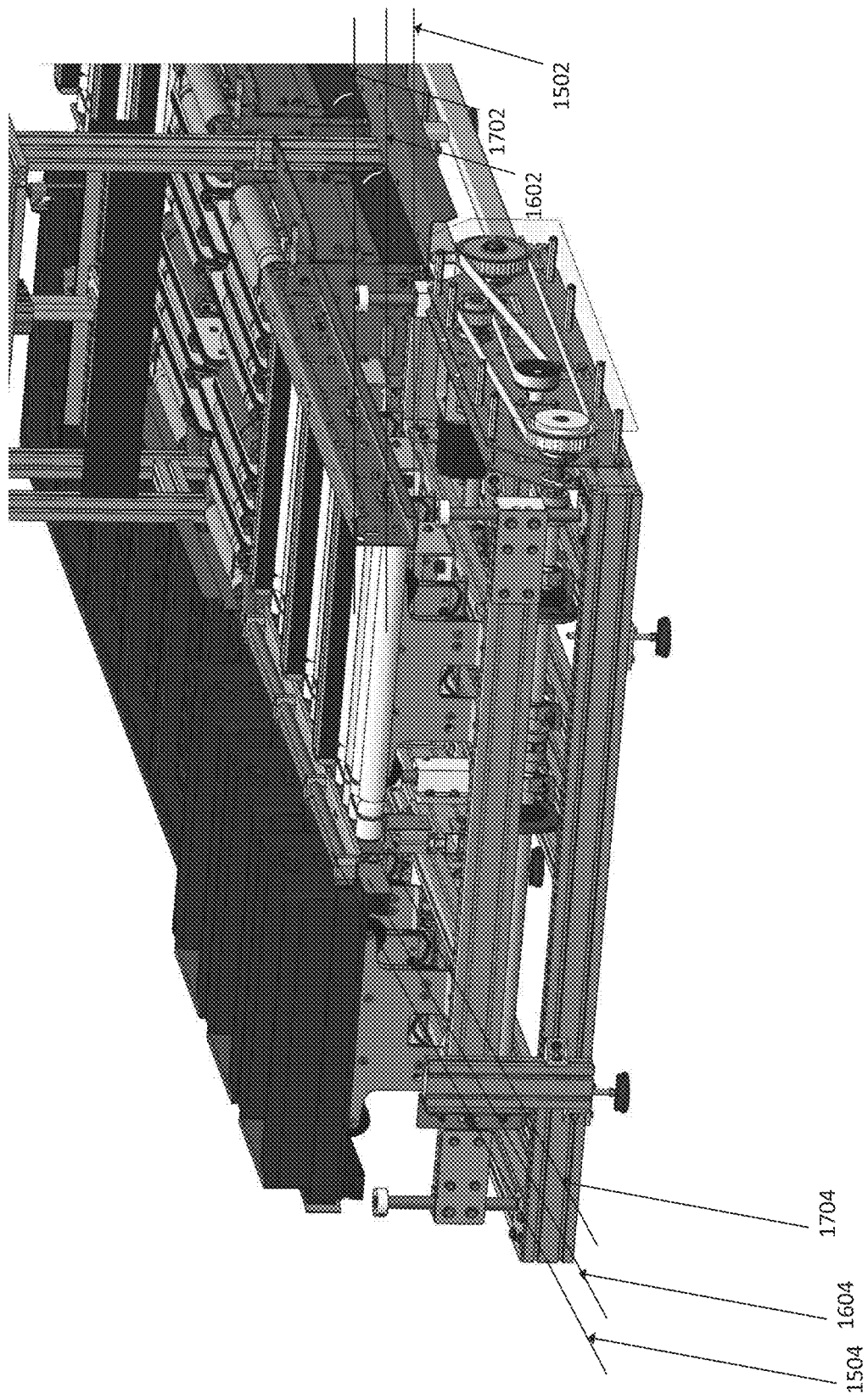
FIG. 23 illustrates a perspective view of the machine in a ninth state, according to one or more embodiments.

FIG. 21-23 illustrates the movement of the first pop-up belt 1002, the second pop-up belt 1004, and the separator wall 1006, when the first camshaft 304 and the second camshaft 306 rotate in the second direction.

Referring to FIG. 21, it can be observed that the first pop-up belt 1002 and the second pop-up belt 1004 are at the extended position 1702 above the first conveyor 110 and the second conveyor 134, respectively. Further, referring to FIG. 21, the separator wall 1006 is at the first position 1704.

Referring to FIG. 22, it can be observed that the first pop-up belt 1002 and the second pop-up belt 1004 are at the third position 1602 below the first conveyor 110 and the second conveyor 134, respectively. Further, the third position 1602 is lower in comparison to the extended position 1702. Further, it can be observed that the separator wall 1006 is at the fourth position 1604, which is above the first position 1704.

Referring to FIG. 23, it can be observed that the first pop-up belt 1002 and the second pop-up belt 1004 are in the retracted position 1502. Further, the separator wall 1006 is at the first position 1704, which is above the fourth position 1604. Accordingly, the separator wall 1006 blocks the movement of the package between the first conveyor 110 and the second conveyor 134.

In some examples, when the first actuation unit 208 is powered off, the weight of the movable frame 204 may causes the movable frame 204 to move in a downward direction. Such downward movement of the movable frame 204 may cause the separator wall frame 206 to move upward direction, as the separator wall frame 206 and the movable frame 204 are coupled to the same camshaft (i.e., second camshaft 306 and first camshaft 304). To avoid such movement due to difference in weight between the movable frame 204 and the separator wall frame 206, in some examples, the separator wall frame 206 may be mounted on the main frame 202 through counter weight members 602 (refer FIG. 6). Such counter weight members 602 may be configured to counter balance the weight difference between the separator wall frame 206 and the movable frame 204. Some examples of the counter weight members 602 may include, but are not limited to, springs.

FIG. 24 illustrates another flowchart 2400 illustrating a method for operating the material handling system 100, according to one or more embodiments described herein.

At step 2402, the material handling system 100 includes means such as the control system 107, the processor 1302, the I/O device interface unit 1306, and/or the like, for determining whether the package to be transferred from the first conveyor 110 to a second conveyor 134 is positioned on the first conveyor 110.

At step 2404, the material handling system 100 includes means such as the control system 107, the processor 1302, the I/O device interface unit 1306, and/or the like, for actuating, by the controller, the motor 302 to rotate the first camshaft 304 in a first direction causing the first pop-up belt 1002 to extend above the first conveyor 110. Further, the rotation of the motor 302 causes the separator wall 1006, positioned between the first conveyor and the second conveyor, to move to a first position such that the first pop-up belt 1002 and the separator wall 1006 facilitate the movement of the package from the first conveyor 110 to the second conveyor 134.

At step 2406, the material handling system 100 includes means such as the control system 107, the processor 1302, the I/O device interface unit 1306, and/or the like, for actuating, by the controller, the motor 302 to rotate the first camshaft 304 in a second direction causing the first pop-up belt 1002 to move to a retracted position below the first conveyor 110 and causing the separator wall 1006 to move to a second position such that the separator wall 1006 blocks the movement of the package between the first conveyor 110 and the second conveyor 134.

What is claimed is:

1. A material handling apparatus comprising:
    a first pop-up belt configured to facilitate movement of a package between a first conveyor and a second conveyor; and
    a separator wall configured to control movement of the package between the first conveyor and the second conveyor,
    wherein, in a first mode of operation, the first pop-up belt extends out from the first conveyor to facilitate movement of the package from the first conveyor to the second conveyor, and the separator wall moves to a first position, wherein, in the first position, the separator wall allows the package to move from the first conveyor to the second conveyor, and
    wherein, in a second mode of operation the first pop-up belt moves to a retracted position below the first conveyor, and the separator wall moves to a second position that blocks movement of the package between the first conveyor and the second conveyor.

2. The material handling apparatus of claim 1, further comprising an actuation unit comprising a motor, and a camshaft coupled to the motor, wherein the camshaft comprises a first cam and a second cam, wherein the first cam is coupled to the first pop-up belt and the second cam is coupled to the separator wall, and wherein the camshaft is configured to rotate in a first direction in the first mode of operation and a second direction in the second mode of operation, further wherein a first orientation of the first cam on the camshaft is different from a second orientation of the second cam on the camshaft.

3. The material handling apparatus of claim 2, wherein the camshaft further comprises a third cam, wherein the second orientation of the second cam is the same as a third orientation of the third cam.

4. The material handling apparatus of claim 3 further comprising a second pop-up belt abutting the third cam, wherein the second pop-up belt is configured to facilitate movement of the package between the first conveyor and the second conveyor.

5. The material handling apparatus of claim 4, wherein the second cam facilitates movement of the second pop-up belt between an extended position and a retracted position, wherein, in the retracted position, the second pop-up belt is positioned below the second conveyor, and wherein, in the extended position, the second pop-up belt extends above the second conveyor.

6. The material handling apparatus of claim 4, wherein the second pop-up belt and the first pop-up belt are positioned in a same plane.

7. The material handling apparatus of claim 2, wherein the first cam facilitates movement of the first pop-up belt between an extended position and the retracted position, and wherein, in the extended position, the first pop-up belt extends above the first conveyor.

8. The material handling apparatus of claim 2, wherein the separator wall further comprises a first end and a second end, wherein the first end of the separator wall abuts the second cam, and wherein, on the second end, rollers are mounted.

9. The material handling apparatus of claim 8, wherein, in the first position, the rollers and the first pop-up belt are in a same plane.

10. The material handling apparatus of claim 8, wherein the rollers are passive rollers that are configured to rotate in accordance with movement of the package from the first conveyor to the second conveyor, wherein the rollers rotate based on a frictional force between the package and the rollers.

11. A material handling system comprising:
a first conveyor;
a first sub-system positioned adjacent to the first conveyor;
a separator wall positioned between the first conveyor and the first sub-system, wherein the separator wall is configured to control movement of a package between the first conveyor and the first sub-system;
a first pop-up belt positioned below the first conveyor, wherein the first pop-up belt is configured to facilitate movement of the package from the first conveyor to the first sub-system;
wherein, in a first mode of operation, the first pop-up belt extends above the first conveyor to facilitate movement of the package from the first conveyor to the first sub-system, and the separator wall moves to a first position, wherein the separator wall, in the first position, allows the package to move from the first conveyor to the first sub-system, and
wherein, in a second mode of operation, the first pop-up belt moves to a retracted position below the first conveyor, and the separator wall moves to a second position that blocks movement of the package between the first conveyor and the first sub-system.

12. The material handling system of claim 11, further comprising a camshaft comprising a first cam and a second cam, wherein the first cam is coupled to the first pop-up belt and the second cam is coupled to the separator wall, and wherein the camshaft is configured to rotate in a first direction in the first mode of operation and a second direction in the second mode of operation, further wherein a first orientation of the first cam on the camshaft is different from a second orientation of the second cam on the camshaft.

13. The material handling system of claim 12, wherein the camshaft further comprises a third cam, wherein a second orientation of the second cam is same as a third orientation of the third cam.

14. The material handling system of claim 13, wherein the first sub-system corresponds to a second conveyor positioned adjacent to the first conveyor, wherein the material handling system further comprises a second pop-up belt abutting the third cam, wherein the second pop-up belt is configured to facilitate movement of the package between the first conveyor and the first sub-system.

15. The material handling system of claim 14, wherein the third cam facilitates movement of the second pop-up belt between an extended position and a retracted position, wherein, in the retracted position, the second pop-up belt is positioned below the first sub-system, and wherein, in the extended position, the second pop-up belt extends above the first sub-system.

16. The material handling system of claim 12, wherein the separator wall further comprises a first end and a second end, wherein the first end of the separator wall abuts the second cam, and wherein, on the second end of the separator wall, rollers are mounted.

17. The material handling system of claim 16, wherein, in the first position, the rollers and the first pop-up belt are in a same plane.

18. A method for operating a material handling system, the method comprising:
determining, by a controller, whether a package to be transferred from a first conveyor to a second conveyor is positioned on the first conveyor;
in response to determining that the package is positioned on the first conveyor, actuating, by the controller, a first pop-up belt to extend above the first conveyor and causing a separator wall, between the first conveyor and the second conveyor, to move to a first position such that the first pop-up belt and the separator wall facilitate movement of the package from the first conveyor to the second conveyor; and
in response to determining that the package has moved from the first conveyor to the second conveyor, actuating, by the controller, the first pop-up belt to move to a retracted position below the first conveyor and causing the separator wall to move to a second position such that the separator wall blocks the movement of the package between the first conveyor and the second conveyor.

19. The method of claim 18 further comprising:
actuating, by the controller, the first pop-up belt to move in a first direction to move the package from the first conveyor to the second conveyor.

20. The method of claim 18, further comprising:
actuating, by the controller, a motor to rotate a camshaft in a first direction causing the first pop-up belt to extend above the first conveyor and causing the separator wall to move to the first position; and
actuating, by the controller, the motor to rotate the camshaft in a second direction causing the first pop-up belt to move to a retracted position below the first conveyor and causing the separator wall to move to the second position.

* * * * *